(12) United States Patent
Kapat et al.

(10) Patent No.: US 12,241,164 B2
(45) Date of Patent: Mar. 4, 2025

(54) SYSTEM AND METHOD FOR HYDROGEN-BASED ENERGY STORAGE

(71) Applicant: University of Central Florida Research Foundation, Inc., Orlando, FL (US)

(72) Inventors: Jayanta Kapat, Oviedo, FL (US); Marcel Otto, Orlando, FL (US); Ladislav Vesely, Winter Park, FL (US)

(*) Notice: Subject to any disclaimer, the term of this patent is extended or adjusted under 35 U.S.C. 154(b) by 13 days.

(21) Appl. No.: 18/072,528

(22) Filed: Nov. 30, 2022

(65) Prior Publication Data
US 2023/0167559 A1    Jun. 1, 2023

Related U.S. Application Data

(60) Provisional application No. 63/284,433, filed on Nov. 30, 2021.

(51) Int. Cl.
*C25B 1/00* (2021.01)
*C25B 1/04* (2021.01)
(Continued)

(52) U.S. Cl.
CPC .............. *C25B 1/04* (2013.01); *F02C 7/222* (2013.01); *H02J 15/008* (2020.01); *H02S 10/10* (2014.12)

(58) Field of Classification Search
CPC ....... C25B 1/04; C25B 15/081; C25B 15/087; F02C 7/222; F02C 3/22; F02C 6/14; H02J 15/008; H02S 10/10
See application file for complete search history.

(56) References Cited

U.S. PATENT DOCUMENTS 3,459,953 A * 8/1969 Hughes et al. ....... F01K 25/005
60/659
4,841,731 A * 6/1989 Tindell .................. F01K 25/005
60/39.12
(Continued)

FOREIGN PATENT DOCUMENTS

CN    112832963 A    5/2021
JP    2011153616 A    8/2011

OTHER PUBLICATIONS

J. Marion et al., "The STEP 10 MWe sCO2 Pilot Demonstration Status Update", Proceedings of the ASME Turbo Expo 2020: Turbomachinery Technical Conference and Exposition, vol. 11: Structures and Dynamics: Structural Mechanics, Vibration, and Damping; Supercritical CO2, V011T31A002. ASME, https://doi.org/10.1115/GT2020-14334, Virtual, Online, Sep. 21-25, 2020.
(Continued)

*Primary Examiner* — Julio C. Gonzalez
(74) *Attorney, Agent, or Firm* — Tiajoloff & Kelly LLP

(57) ABSTRACT

An energy storage system and method employ electrolysis to convert excess electrical energy into hydrogen gas and oxygen gas stored in cryogenic flux capacitor units. When needed, the hydrogen and oxygen are liberated from the CFCs and mixed with supercritical $CO_2$ and combusted in a combustion chamber without any nitrogen or air present to form a heated mixture of water and sCO2 that drives a turbine that creates energy that is returned to the power grid. The water in the sCO2 mixture is then extracted and returned to a reservoir for electrolysis when needed again, resulting in a closed system for storing electrical energy.

24 Claims, 13 Drawing Sheets

(51) Int. Cl.
- F02C 7/22 (2006.01)
- H02J 15/00 (2006.01)
- H02S 10/10 (2014.01)

(56) References Cited

U.S. PATENT DOCUMENTS

| | | | |
|---|---|---|---|
| 10,787,963 B2 | 9/2020 | Amos et al. | |
| 2010/0114395 A1 | 5/2010 | Hinatsu | |
| 2018/0287387 A1* | 10/2018 | Lansing, Jr. | F03D 9/11 |
| 2019/0056064 A1 | 2/2019 | Swanger et al. | |
| 2022/0065162 A1* | 3/2022 | Hunt | H02J 15/008 |

OTHER PUBLICATIONS

F. Crespi et al., "Thermal Efficiency Gains Enabled by Using CO2 Mixtures in Supercritical Power Cycles", Energy 238 (2022)121899, ISSN 0360-5442, https://doi.org/10.1016/j.energy.2021.121899, Aug. 28, 2021.
A. Khadse et al., "A Numerical Study on Conjugate Heat Transfer for Supercritical CO2 Turbine Blade With Cooling Channels", Proceedings of the ASME Turbo Expo 2020: Turbomachinery Technical Conference and Exposition, vol. 11: Structures and Dynamics: Structural Mechanics, Vibration, and Damping; Supercritical CO2, V011T31A007. ASME, https://doi.org/10.1115/GT2020-14679, Virtual, Online, Sep. 21-25, 2020.
M. Otto et al., "Rib Turbulated Pin Fin Array for Trailing Edge Cooling", Proceedings of the ASME Turbo Expo 2017: Turbomachinery Technical Conference and Exposition. vol. 5A: Heat Transfer, Charlotte, North Carolina, US, V05AT16A001, ASME. https://doi.org/10.1115/GT2017-63044, Jun. 26-30, 2017.
E. Gabriel-Ohanu et al., "Optimization of a Primary Heat Exchanger for FLiBe Molten Salt Nuclear Reactor With sCO2 Power System", Proceedings of the ASME Turbo Expo 2021: Turbomachinery Technical Conference and Exposition, vol. 10: Supercritical CO2, Virtual, Online, V010T30A023, ASME, https://doi.org/10.1115/GT2021-59939, Jun. 7-11, 2021.
L.M. Das, "Hydrogen-oxygen reaction mechanism and its implication to hydrogen engine combustion", International Journal of Hydrogen Energy, vol. 21, No. 8, pp. 703-715, Aug. 1996.
N. Cohen et al., "Chemical Kinetic Data Sheets for High-Temperature Chemical Reactions", Journal of physical and chemical reference data, vol. 12, No. 3, pp. 531-590, Jul. 1983.
A.A. Konnov, "On the role of excited species in hydrogen combustion", Combustion and Flame, vol. 162, No. 10, pp. 3755-3772, Jul. 23, 2015.
L. Vesely et al., "Effect of Multicomponent Mixtures on Cycles with Supercritical Carbon Dioxide", ASME Turbo Expo 2017, Turbomachinery Technical Conference and Exposition, vol. 9: Oil and Gas Applications; Supercritical CO2 Power Cycles; Wind Energy, Paper No. GT2017-64044, pp. V009T38A016; ISBN: 978-0-7918-5096-1, doi:10.1115/GT2017-64044, Jun. 26, 2017.
L. Vesely et al., "Pinch Point Analysis of Heat Exchangers for Supercritical Carbon Dioxide with Gaseous Admixtures in CCS Systems", 2016: Energy Procedia, vol. 86, pp. 489-499, ISSN: 1876-6102, 2016.
F. Crespi et al., "Supercritical carbon dioxide cycles for power generation: A review", Applied Energy, vol. 195, pp. 152-183, Mar. 17, 2017.
G. Angelino, "Carbon Dioxide Condensation Cycles for Power Production", 1968: ASME Paper No. 68-GT-23, Mar. 17, 1968.
V. Dostal et al., "A supercritical carbon dioxide cycle for next generation nuclear reactors", Massachusetts Institute of Technology, Department of Nuclear Engineering, Jun. 16, 2004.
G. Kimzey, "Development of a Brayton Bottoming Cycle Using Supercritical Carbon Dioxide as the Working Fluid", Electric Power Research Institute Report, Palo Alto (CA), 2012.
R. J. Allam et al., "The Oxy-Fuel, Supercritical CO2Allam Cycle: New Cycle Developments to Produce Even Lower-Cost Electricity From Fossil Fuels Without Atmospheric Emissions", 2014: ASME Turbo Expo 2014: Turbine Technical Conference and Exposition, vol. 3B: Oil and Gas Applications; ISBN: 978-0-7918-4566-0, doi: 10.1115/GT2014-26952, Jun. 16, 2014.
L. Vesely et al., "Effect of Impurities on Compressor and Cooler in Supercritical Carbon Dioxide Cycles", Journal of Energy Resources Technology, vol. 141, pp. 012003-1 to 012003-8, Paper No. JERT-18-1331; ISSN:0195-0738, https://doi.org/10.1115/1.4040581, Aug. 9, 2018.
S. Roussanaly et al., "Techno-economic evaluation of CO2 transport from a lignite-fired IGCC plant in the Czech Republic", International Journal of Greenhouse Gas Control, vol. 65, Oct. 2017, pp. 235-250, ISSN:1750-5836, Oct. 5, 2017.
Monthly Energy Review, DOE/EIA-0035(2021/5), May 2021.
L. Vesely et al., "Study of the cooling systems with S-CO2 for the DEMO fusion power reactor", Fusion Engineering and Design, vol. 124, pp. 244-247, https://doi.org/10.1016/j.fusengdes.2017.05.029, May 16, 2017.
Zhiwen Ma et al., "Advanced Supercritical Carbon Dioxide Power Cycle Configurations for Use in Concentrating Solar Power Systems", 2011: NREL/CP-5500-50787, May 24, 2011.
B.D. Iverson et al., "Supercritical CO2 Brayton Cycles for Solar-thermal Energy", 2013: Elsevier Ltd. 1-s2.0-S0306261913005278-main, Jul. 20, 2013.
M. Marchionni et al., "Review of supercritical carbon dioxide (sCO2) technologies for high-grade waste heat to power conversion", SN Appl. Sci. 2, 611 (2020). https://doi.org/10.1007/s42452-020-2116-6, Mar. 11, 2020.
Rodney Allam et al., "Demonstration of the Allam Cycle: An Update on the Development Status of a High Efficiency Supercritical Carbon Dioxide Power Process Employing Full Carbon Capture", Energy Procedia, vol. 114, pp. 5948-5966, ISSN 1876-6102, https://doi.org/10.1016/j.egypro.2017.03.1731, Nov. 14, 2016.
A.M. Swanger et al., "Cryogenic Flux Capacitor for Advanced Molecular and Energy Storage Applications", IOP Conference Series: Materials Science and Engineering Mar. 1, 2020, vol. 755, No. 1, p. 012051, 2020.
M. T. White et al., "Review of supercritical CO2 technologies and systems for power generation", Applied Thermal Engineering, vol. 185, 2021, 116447, ISSN 1359-4311, https://doi.org/10.1016/j.applthermaleng.2020.116447, Dec. 10, 2020.
J. Vujić et al., "Small modular reactors: Simpler, safer, cheaper?", Energy, vol. 45, Issue 1, 2012, pp. 288-295, ISSN 0360-5442, https://doi.org/10.1016/j.energy.2012.01.078, Mar. 17, 2012.
B. Mignacca et al., "Economics and finance of Small Modular Reactors: A systematic review and research agenda", Renewable and Sustainable Energy Reviews, vol. 118, 2020, 109519, ISSN 1364-0321, https://doi.org/10.1016/j.rser.2019.109519, Nov. 1, 2019.
Y. Liu et al., "Supercritical CO2 Brayton cycle: A state of-the-art review", Energy, vol. 189, 2019, 115900, ISSN 0360-5442, https://doi.org/10.1016/j.energy.2019.115900, Aug. 6, 2019.
L. Vesely et al., "Optimization of Supercritical CO 2 Power Conversion System With an Integrated Energy Storage for the Pulsed DEMO", IEEE Transactions on Plasma Science, vol. 48, No. 6, pp. 1715-1720, Feb. 9, 2020.
D. Maisonnier et al., "PPCS Team. DEMO and fusion power plant conceptual studies in Europe", Fusion Engineering and Design. vol. 81(8-14), pp. 1123-1130, Dec. 20, 2005.
A. Alenezi et al., "Exergoeconomic Analysis Of A Hybrid sCO2 Brayton Power Cycle", Feb. 14, 2022.
M. Zhiwen et al., "Advanced Supercritical Carbon Dioxide Power Cycle Configurations for Use in Concentrating Solar Power Systems", 2011: NREL/CP-5500-50787, May 24, 2011.
36. M. Shahabuddin et al., "A critical review on the development and challenges of concentrated solar power technologies", Sustainable Energy Technologies and Assessments, vol. 47, 2021, 101434, ISSN 2213-1388, https://doi.org/10.1016/j.seta.2021.101434, Jun. 29, 2021.
E. Beaugendre et al., "Integration of vortex tubes in a trigenerative compressed air energy storage system", Energy Conversion and Management, vol. 240, 2021, 114225, ISSN 0196-8904, https://doi.org/10.1016/j.enconman.2021.114225, May 13, 2021.
A. N. Abdalla et al., "Integration of energy storage system and renewable energy sources based on artificial intelligence: An over-

(56) References Cited

OTHER PUBLICATIONS view", Journal of Energy Storage, vol. 40, 2021, 102811, ISSN 2352-152X, https://doi.org/10.1016/j.est.2021.102811, Jun. 17, 2021.
G. Liu et al., "Comparative study on heat extraction performance between gravity heat pipe system and enhanced geothermal system", Geothermics, vol. 96, 2021, 102218, ISSN 0375-6505, https://doi.org/10.1016/j.geothermics.2021.102218, Aug. 10, 2021.
M. Rashid et al., "Hydrogen Production by Water Electrolysis: A Review of Alkaline Water Electrolysis, PEM Water Electrolysis and High Temperature Water Electrolysis", International Journal of Engineering and Advanced Technology (IJEAT), ISSN: 2249-8958, vol. 4, Issue 3, Feb. 2015.
A. M. Swanger et al., 2020 IOP Conf. Ser.: Mater. Sci. Eng. 755 012051, 2020.
M. Bertini et al., "Evaluation of the property methods for pure and mixture of CO2 for power cycles analysis", Energy Conversion and Management, vol. 245, 2021, 114568, ISSN 0196-8904, https://doi.org/10.1016/j.enconman.2021.114568, Aug. 16, 2021.
A. K. Sleiti et al., "Direct-fired oxy-combustion supercritical-CO2 power cycle with novel preheating configurations—thermodynamic and exergoeconomic analyses", Energy, vol. 226, 2021, 120441, ISSN 0360-5442, https://doi.org/10.1016/j.energy.2021.120441, Mar. 22, 2021.
P. Higginbotham et al., "Oxygen supply for oxyfuel CO2 capture", International Journal of Greenhouse Gas Control, vol. 5, Supplement 1, 2011, pp. S194-S203, ISSN 1750-5836, https://doi.org/10.1016/j.ijggc.2011.03.007, Apr. 22, 2011.
C. Fu et al., "Using exergy analysis to reduce power consumption in air separation units for oxy-combustion processes", Energy, vol. 44, Issue 1, 2012, pp. 60-68, ISSN 0360-5442, https://doi.org/10.1016/j.energy.2012.01.065, Feb. 22, 2012.
W. Liu et al., "The production and application of hydrogen in steel industry", International Journal of Hydrogen Energy, vol. 46, Issue 17, 2021, pp. 10548-10569, ISSN 0360-3199, https://doi.org/10.1016/j.ijhydene.2020.12.123, Jan. 6, 2021.
M. Yue et al., "Hydrogen energy systems: A critical review of technologies, applications, trends and challenges", Renewable and Sustainable Energy Reviews, vol. 146, 2021, 111180, ISSN 1364-0321, https://doi.org/10.1016/j.rser.2021.111180, May 3, 2021.
A. Baroutaji et al., "Comprehensive investigation on hydrogen and fuel cell technology in the aviation and aerospace sectors", Renewable and Sustainable Energy Reviews, vol. 106, 2019, pp. 31-40, ISSN 1364-0321, https://doi.org/10.1016/j.rser.2019.02.022, Feb. 27, 2019.
Bamisile et al., "Comparative performance analysis of solar powered supercritical-transcritical CO2 based systems for hydrogen production and multigeneration", International Journal of Hydrogen Energy, vol. 46, Issue 52, 2021, pp. 26272-26288, ISSN 0360-3199, https://doi.org/10.1016/j.ijhydene.2021.05.122, Jun. 10, 2021.
M. Ditaranto et al., "Concept of hydrogen fired gas turbine cycle with exhaust gas recirculation: Assessment of process performance", Energy, vol. 192, 2020, 116646, ISSN 0360-5442, https://doi.org/10.1016/j.energy.2019.116646, Apr. 10, 2015.
S. Algurab et al., "Long-Term Hydrogen Storage Utilizing CFC Gas-Storage System", Advanced Technologies for Hypersonic Propulsive, Energetic and Reusable Platforms Technical Conf. and Exposition, Jul. 30, 2021.
S. S. Kumar, "Hydrogen production by PEM water electrolysis—A review", Materials Science for Energy Technologies, vol. 2, Issue 3, 2019, pp. 442-454, ISSN 2589-2991, https://doi.org/10.1016/j.mset.2019.03.002, Mar. 29, 2019.
D. Di Bona et al., "Thermal Efficiency Gains Enabled by Using CO2 Mixtures in Supercritical Power Cycles", Energy, 2021, 121899, ISSN 0360-5442, https://doi.org/10.1016/j.energy.2021.121899, Aug. 28, 2021.
M. Ozturk et al., "A comprehensive review on power-to-gas with hydrogen options for cleaner applications", International Journal of Hydrogen Energy, vol. 46, Issue 62, 2021, pp. 31511-31522, ISSN 0360-3199, https://doi.org/10.1016/j.ijhydene.2021.07.066, Aug. 6, 2021.
R.J. Allam et al., "The OXY-fuel, supercritical CO2 allam cycle: New cycle developments to produce even lower-cost electricity from fossil fuels without atmospheric emissions", Proc. ASME Turbo Expo, 2014. https://doi.org/10.1115/GT2014-26952, Jun. 16, 2014.
E.I. Yantovski et al., "The COOPERATE—demo power cycle", Energy Conversion and Management, vol. 36, Issues 6-9, pp. 861-864, ISSN 0196-8904, https://doi.org/10.1016/0196-8904(95)00139-5, 1995.
N. Weiland et al., "Techno-economic analysis of an integrated gasification direct-fired supercritical CO2 power cycle", Fuel, vol. 212, 2018, pp. 613-625, ISSN 0016-2361, https://doi.org/10.1016/j.fuel.2017.10.022, Oct. 26, 2017.
A. Deshmukh et al., "Transient thermodynamic modeling of air cooler in supercritical CO2 Brayton cycle for solar molten salt application", Journal of Energy Resources Technology, vol. 143, No. 2 (2021), 022103, Aug. 7, 2020.
L. Calderon et al., "Adiabatic Film Cooling Effectiveness of a LAM Fabricated Porous Leading Edge Segment of a Turbine Blade", Proceedings of the ASME Turbo Expo 2018: Turbomachinery Technical Conference and Exposition, vol. 5B: Heat Transfer. Oslo, Norway, V05BT21A004. ASME. https://doi.org/10.1115/GT2018-77114, Jun. 11, 2018.
B. Ealy et al., (May 9, 2017). "Characterization of Laser Additive Manufacturing-Fabricated Porous Superalloys for Turbine Components", ASME. J. Eng. Gas Turbines Power. Oct. 2017; vol. 139, No. 10\): 102102. https://doi.org/10.1115/1.4035560, May 9, 2017.
M. Otero et al., "Characteristics of a Premixed Reacting Jet-in-Crossflow at Elevated Pressures", AIAA Propulsion and Energy 2019 Forum, p. 4289. 2019, https://doi.org/10.2514/6.2019-4290, Aug. 19, 2019.
N.N. Smirnov et al., "Modeling and simulation of hydrogen combustion in engines", International Journal of Hydrogen Energy, vol. 39, Issue 2, 2014, pp. 1122-1136, ISSN 0360-3199, https://doi.org/10.1016/j.ijhydene.2013.10.097, Nov. 16, 2013.
S. Abanades et al., "Screening of water-splitting thermochemical cycles potentially attractive for hydrogen production by concentrated solar energy", Energy, vol. 31, Issue 14, 2006, pp. 2805-2822, ISSN 0360-5442, https://doi.org/10.1016/j.energy.2005.11.002, Apr. 22, 2005.
W. Villasmil et al., "Hydrogen production by hydrogen sulfide splitting using concentrated solar energy—Thermodynamics and economic evaluation", Energy Conversion and Management, vol. 51, Issue 11, 2010, pp. 2353-2361, ISSN 0196-8904, https://doi.org/10.1016/j.enconman.2010.04.009, May 18, 2010.
M. Otto et al., "A Novel Long-Duration Hydrogen Storage Concept Without Liquefaction and High Pressure Suitable for Onsite Blending", Proceedings of the ASME Turbo Expo 2021: Turbomachinery Technical Conference and Exposition, vol. 6: Ceramics and Ceramic Composites; Coal, Biomass, Hydrogen, and Alternative Fuels; Microturbines, Turbochargers, and Small Turbomachines, V006T03A007, ASME. https://doi.org/10.1115/GT2021-59393, Virtual, Online. Jun. 7-11, 2021.

\* cited by examiner

Isovolumetric process in CFC for $O_2$ and $H_2$

Specific heat of $CO_2$ based on temperature and pressure

Density of $CO_2$ based on temperature and pressure

Pure $CO_2$          $CO_2$ + 5% $H_2O$

Effect of $H_2O$ on the compressor specific power [kW/kg]

T-S Diagram of the Direct Fired sCO2 Cycle

P-H Diagram of the Direct Fired sCO2 Cycle

Critical point of CO₂ alone and CO₂ with other substances

Effect of CO₂ mixtures on the Turbine Efficiency

Effect of CO$_2$ mixtures on Turbine specific power

Effect of H₂O on the recuperative heat exchanger - pure $CO_2$

Effect of H₂O on the recuperative heat exchanger - 5 % $H_2O$

Specific net power and cycle efficiency
for variable turbine inlet pressure and TIT 1473° K.

SYSTEM AND METHOD FOR HYDROGEN-BASED ENERGY STORAGE

RELATED APPLICATIONS

This application claims priority of U.S. provisional application Ser. No. 63/284,433 filed on Nov. 30, 2021, which is incorporated herein by reference.

FIELD OF THE INVENTION

This invention relates to systems and methods of storing electrical energy, and, more particularly, to those for storing energy using hydrogen gas.

BACKGROUND OF THE INVENTION

Current power cycle systems produce affordable and reliable energy for the commercial, residential, or industrial sectors. However, growing population and consistent increase in energy consumption will give rise to associated pollution and $CO_2$ emission. Efforts to achieve net-zero emissions of $CO_2$ in the future require development of novel carbon capture systems (CCS) and the next generation of power systems. The integration of CCS, however, will increase the capital and operating cost of the power system, resulting in higher Levelized Cost of Electricity (LCOE), making its adaption to developed and developing nations prohibitive.

The next generation of power systems may still produce affordable and reliable electricity or heat for commercial, residential, or industrial sectors with minimal effect on the operating cost. Next generation power systems may be, for example, fission and fusion power systems, especially small modular reactors (SMR), concentrated solar power (CSP), natural gas direct-fired systems, hybrid systems, and geothermal systems, functioning alongside advanced energy storage systems. Power generated from renewable energy sources such as wind and sun may also be blended into the energy mix as a fossil-free alternative, although the intermittent nature of wind and sun requires unprecedented steps to rebalance modern power grid in terms of production and consumption.

Energy can be stored in many different forms, including but not limited to mechanical storage, electrical, thermal, and chemical storage, each with its advantages and drawbacks. Each storage form requires a respective system or machine to store the energy and to integrate with the existing power grid and power production assets. Generally, storage machinery converts existing electrical energy into another form of energy that can be stored more easily. A reconversion mechanism and machine then regains the electrical energy from storage. Since two processes are involved for storage and reconversion, efficiencies of both processes have to be considered during evaluation. Forward and backward conversion efficiencies together account for the roundtrip efficiency, which does not consider additional losses during storage such as leakage or self-discharge.

Batteries can be a suitable short-term storage solution up to six hours, but have unfavorable economics when considering monthly to seasonal energy storage.

Chemical energy storage relies on reversible reactions to store energy, and involves endothermic chemical reactions that are adopted to conserve energy and exothermic reactions that retrieve the stored energy. A benefit of chemical energy storage is that it utilizes less volume and has less density while providing a large amount of energy storage capacity.

As a prominent chemical energy storage option, hydrogen energy storage is an effective alternative for thermal energy storage. Besides liquid or gaseous biofuels, hydrogen is a common substance that is created in the endothermic reactions involved. The creation of hydrogen gas to store electrical energy as chemical energy storage is usually referred to as Power to Gas (P2G). Electrolysis to produce the hydrogen gas, i.e., the electrical decomposition of water into hydrogen and oxygen through a DC voltage potential, has a current conversion efficiency of about 70%.

The two most common ways to retrieve the stored chemical energy by rearranging chemical bonds are (1) fuel cells or (2) combustion. In the former, fuel cells operate as the inverse of electrolysis, wherein hydrogen oxidizes in air in a redox reaction and produces water and DC electricity. In the latter, combustion is the burning of the storage gas, which releases thermal energy, i.e., heat. An expander or turbine can be used to convert heat to mechanical energy, which in turn drives a shaft that is connected to a generator to produce electricity.

Hydrogen, as the most abundantly available substance in the universe, is the key gas in P2G, and an entire economy sector revolves around this molecule, i.e., the Hydrogen Economy. Green hydrogen, meaning hydrogen generated by renewable energy, is suggested as the key enabler for renewable energy sources such as wind and solar, because hydrogen can be produced via electrolysis using excess energy during times of oversupply and reconverted to electrical energy in times of high demand by using fuel cells or conventional combustion in already existing gas turbine power plants. The combustion of hydrogen to recover the stored electricity, however, has the drawback of high NOx emissions, because a hydrogen flame typically burns higher than current state-of-the-art fossil-fuel powered gas turbines.

Another problem is that hydrogen is typically stored as a low-pressure, cryogenic liquid, or as a high-pressure gas. Cryogenic liquids can provide high energy and volume densities, but they require complex storage systems to limit boil-off, and are not well suited for overly dynamic situations where the tank orientation cannot be controlled. In the case of regular hydrogen liquefaction, ortho-H2 switches automatically to para-H2 through an exothermic reaction, and that leads significantly to boil off.

Cryogenic energy storage present issues of intricacy and liquefaction. Cryogenic liquid tanks are complex and need vacuum jackets and suspension systems between inner and outer vessels to enable the storage of liquid with reasonably low boil-off losses. Moreover, these tanks are typically large, heavy, and cannot be made into conformal shapes.

Conversely, while high-pressure gas storage bottles are less complex, are unaffected by orientation, and can be kept at room temperature, they require thick walls to withstand the high pressure, which makes them very heavy, as well. Moreover, the energy densities associated with high-pressure gas storage are dramatically lower than for cryogenic liquids, even at high pressures (up to 700 bar). The liquefaction process is highly energy-intensive, approximately 35% of the fuel energy, and hence reduces the net performance of gas turbine power plants that might use such hydrogen storage.

Systems of the prior art that rely on hydrogen therefore are inefficient, prone to $NO_x$ emissions, and require complex structures associated with cryogenic storage of liquid hydrogen, making them cumbersome.

SUMMARY OF THE INVENTION

It is accordingly an object of the invention to provide a system and method of storing and retrieving energy that avoids the problems associated with the prior art. An aspect of the invention is that this is achieved by making use of the commonly neglected byproduct of the electrolysis step, i.e., the oxygen that is released with hydrogen when water is electrolyzed.

According to an aspect of the invention, a system for storing electrical energy from a power supply and subsequently releasing the stored energy has an input receiving the electrical energy from the power supply, a reservoir holding water, and an electrolysis device connected with the reservoir and receiving the electrical energy from the input. The electrolysis device uses the electrical energy to electrolyze the water in the reservoir so as to convert the water to hydrogen gas and oxygen gas. A first storage device receives and stores the hydrogen, and a second storage device receives and stores the oxygen. First and second conduits are connected with outputs of the first and second storage devices respectively, and a turbine system has a combustion chamber with which the conduits communicate. The system provides that hydrogen and oxygen from the storage devices flow through the conduits and combine in the combustion chamber and said hydrogen is combusted with the oxygen therein so as to form water and generate energy driving the turbine and turning its output shaft. A generator is operatively associated with the turbine output shaft so as to produce electricity when the shaft turns and to output the electricity through an electrical output connection.

According to another aspect of the invention, a method for storing energy received from a power source comprises using the energy to electrolyze internal water so as to produce hydrogen and oxygen, and storing the hydrogen and oxygen in respective storage devices such that the hydrogen and oxygen can be recovered from them. The hydrogen and oxygen are obtained from the storage devices and the hydrogen and oxygen are caused to react with each other in a combustion chamber in a turbine system so as to cause the turbine system to produce a mechanical energy output from the reaction. Electrical energy is generated from the mechanical energy output of the turbine system.

According to another aspect of the invention, a system comprises a power supply generating electrical current at time-varying power levels. An electrolysis device is connected with the power supply and receives the electrical current from the power supply, and uses the electrical current to electrolyze the water in the reservoir so as to convert the water to hydrogen gas and oxygen gas. A first cryogenic flux capacitor device receives the hydrogen so that the hydrogen is adsorbed into its retention material, and a second cryogenic flux capacitor device receives the oxygen so that the oxygen is adsorbed into retention material of the second cryogenic flux capacitor device. First and second conduits are connected with outputs of the first and second cryogenic flux capacitor devices respectively, and those conduits each have a respective pressure valve in it blocking passage of the hydrogen or the oxygen therethrough until pressure of the hydrogen or oxygen exceeds a predetermined pressure. A turbine system contains supercritical $CO_2$ as working fluid flowing to a combustion chamber of the turbine system. The conduits communicate with the combustion chamber of the turbine system, and the hydrogen is combusted with the oxygen in the combustion chamber so as to form a heated mixture of water produced by the combustion with the supercritical $CO_2$. A heat exchanger or cooler extracts heat from the mixture after passage through the turbine and transmits the heat at least partially so as to heat the first and second cryogenic flux capacitor devices. A separator separates the water from the supercritical $CO_2$ and supplies the water to the reservoir so that the system operates as a closed system substantially without any intake of air or any release of $CO_2$ or water. The mixture drives a turbine output shaft, and a generator is operatively associated with the turbine output shaft so as to produce electricity when the shaft turns and to output the electricity through an electrical output connection.

In the systems and methods of the invention, the hydrogen and oxygen storage devices are preferably each a cryogenic flux capacitor (CFC). The cryogenic flux capacitor (CFC) was developed and patented by NASA, and is described in U.S. patent application US 2019/0056064 of Swanger et al. and Swanger published Feb. 21, 2019, and in the article "Cryogenic Flux Capacitor for Advanced Molecular and Energy Storage Applications", TOP Conference Series: Materials Science and Engineering 2020 Mar 1 (Vol. 755, No. 1, p. 012051), both of which publications are herein incorporated by reference.

The storing of the hydrogen and the oxygen in CFCs involves causing adsorption of the hydrogen and the oxygen into the retention material in the respective CFC. That adsorption produces heat that is released into the ambient environment. Extraction of the hydrogen or oxygen gas from the respective CFC is done by supplying heat to the CFC, which causes it to release the gas stored in it. The heat is preferably derived at least partly from combustion of the hydrogen and oxygen in the turbine.

The turbine used for retrieval of the energy stored as $H_2$ and $O_2$ is preferably a power-generating turbine having a $H_2/O_2$—$CO_2$ direct fired power cycle, which enables long-term energy storage and highly-efficient reconversion of electricity from the storage medium. The power-conversion cycle is a supercritical carbon dioxide (sCO2) power cycle, which has a high efficiency for a higher turbine inlet temperature (TIT), and is more compact in size compared to the equipment needed for other steam Rankin or gas Brayton cycle based systems due to its operation in the critical region and near the critical point of $CO_2$ where the fluid density is high. The compactness of the equipment is advantageous in terms of capital cost.

The use of such an sCO2 fluid based retrieval system for combusting stored $H_2$ and $O_2$ provides efficient recover of energy stored by electrolysis of water and adsorption of the resulting hydrogen and oxygen in CFCs. In addition, because the hydrogen combustion that drives the turbine uses the stored oxygen for combustion instead of air containing nitrogen, the systems and methods here diminish or eliminate the production of $NO_x$ in the combustion products.

Other advantages and benefits of the invention will be apparent to those of ordinary skill in the art from the disclosure herein.

DETAILED DISCLOSURE

Figure 1:
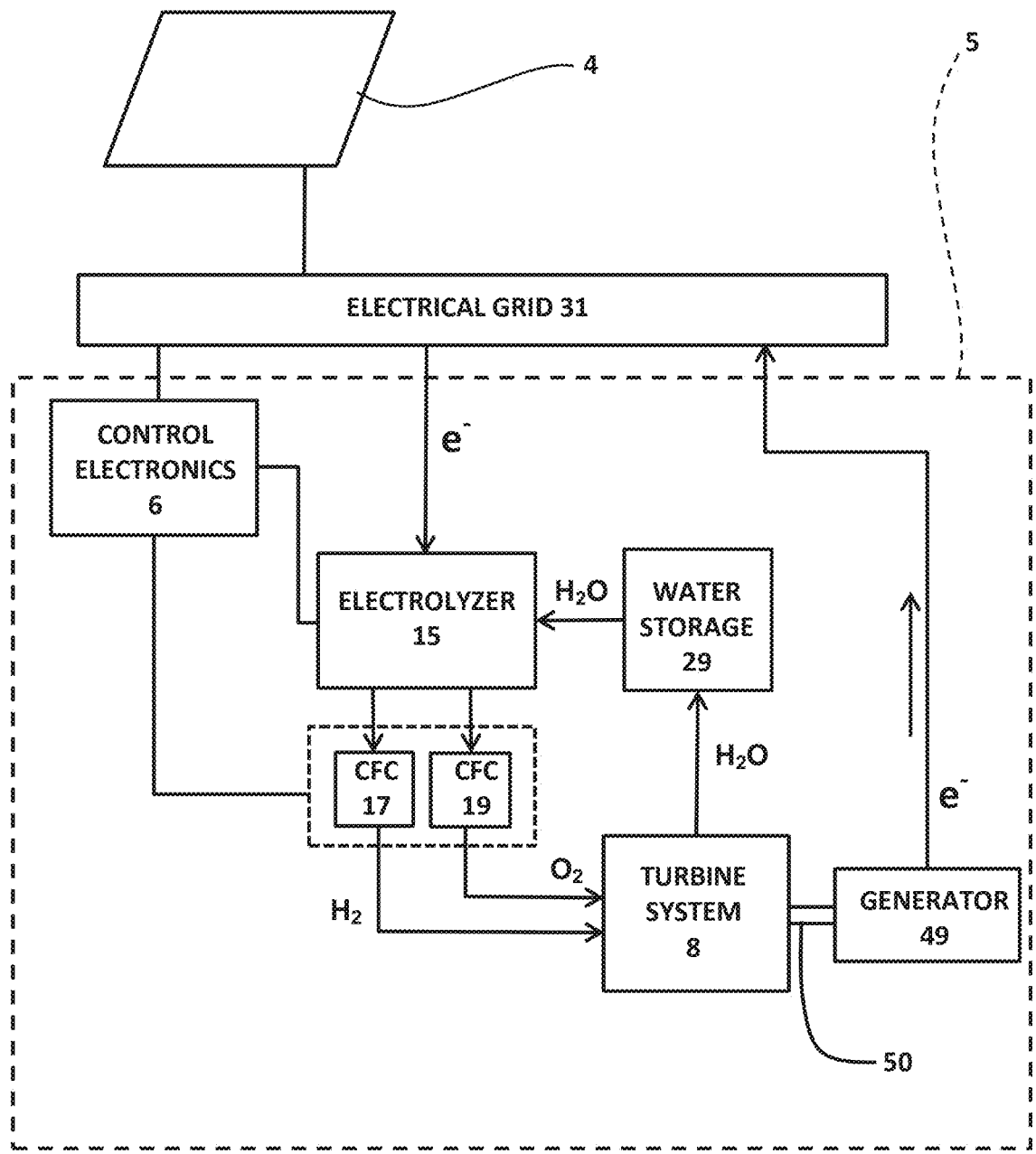
FIG. 1 is a diagram of the overall design of the $H_2/O_2$ energy storage system of the invention.

Referring to FIG. 1, a system according to the invention has a power source 4, which may be a renewable energy source, such as solar or wind power, or another more continuous level power source, such as a chemical or nuclear power generator. The power source, irrespective of its configuration, produces electrical power and supplies it to an electrical grid 31, which transmits the electricity, usually as AC current, over the grid 31 to demands, which are typically home, commercial, industrial or other electrical loads, either local or in a larger power-supplied area.

The storage system 5 is connected with the grid 31 and, depending on the availability and potentially cost of electrical power, either receives and stores electrical energy from the grid, or returns stored energy to the grid 31. Control electronics 6 typically include a computer system having one or more processors, data inputs, user-accessible input and output devices like a keyboard and a display monitor, and also data storage devices accessible to the processor(s), which operate according to stored software instructions data, as is well known in the electronics art.

Control electronics 6 are connected with the grid 31 and determine whether the power output level of the power source 4 has surplus electrical power, either by a comparison of the power output level with a predetermined threshold surplus power level, or by a comparison of the power output level of the power source with the demand of the grid 31 with a predetermined relative supply surplus power level. The control electronics also may have a data linkage over the Internet to receive data that defines the current cost of electrical power on the grid in real time from data sources such as www.eia.gov, and compares the cost of power with predetermined threshold values. It is possible to provide an artificial intelligence (AI) system that determines the existence of a power surplus based on conditions of the grid, the power generating device 4, and patterns in power generation, as well as data provided to the AI system over the Internet or locally. Responsive to the determination that the comparison indicates a power surplus, the control electronics 6 initiate a storage process to save the surplus power for a later time, when there is a demand for it.

To store the surplus power, the control electronic circuitry causes the surplus power from the grid 31 to flow to an electrolyzer 15 that receives water from water storage reservoir 13 and subjects it to electrolysis so as to separate the $H_2O$ water molecules into hydrogen gas ($H_2$) and oxygen gas ($O_2$). The control circuitry 6 also activates CFC storage units 17 and 19 so that they that receive the $H_2$ and $O_2$ gases, respectively, and store them separately for later use, as will be detailed below.

The control circuitry also determines when there is a power shortfall and a consequent need for the power that has been stored, either based on a comparison of the power output level with a predetermined threshold low power output level, or a comparison of the power demand with the current power source power output level, or an increase in the cost of electrical power above a threshold cost. When a power shortfall is determined, the control circuitry 6 causes the CFC units 17 and 19 to release the $H_2$ and $O_2$ gas stored in them, and the $H_2$ and $O_2$ proceed to a turbine system 8, where the $H_2$ undergoes combustion with the $O_2$ released from the CFC unit 19. The combustion produces a heated fluid that drives the turbine 8, which causes rotation of turbine shaft 50, which turns generator 49. Generator 49 generates electrical energy that is transmitted to the grid 31, offsetting any reduction or shortfall in the power production.

The combustion of the $H_2$ with the $O_2$ produces $H_2O$ in a mixture with the working fluid of the turbine. The $H_2O$ is separated from the working fluid and sent to water storage reservoir 13, where it is stored for re-use in electrolysis in the future.

In the preferred embodiment, the system is a closed system that receives electrical power, stores it for a period of time and then outputs the electrical power when conditions warrant, all without intake of air or fuel, outputting only electrical power and some heat produced by the system operation. This type of energy storage system provides support for power generating systems, e.g., renewable sources of energy like solar power or wind power, that generate power at varying levels, by storing power from peak production periods and returning that stored power in lull periods. It also provides for storage of power generated by power sources that produce a constant level of power while the demands on the grid fluctuate, where the surplus power created in times of lower demand is stored.

The power system of the invention preferably uses a sCO2 power cycle combined with hydrogen separation (by electrolysis), hydrogen and gas storage (using CFCs), and hydrogen-fired turbine combustion technologies. Hydrogen-fired turbines are known in the art, such as that described in M. Ditaranto et al., "Concept of hydrogen fired gas turbine cycle with exhaust gas recirculation: Assessment of process performance", Energy, Vol. 192, Article 116646 Feb. 1, 2020, available at https://doi.org/10.1016/j.energy.2019.116646, and herein incorporated by reference.

Figure 2:
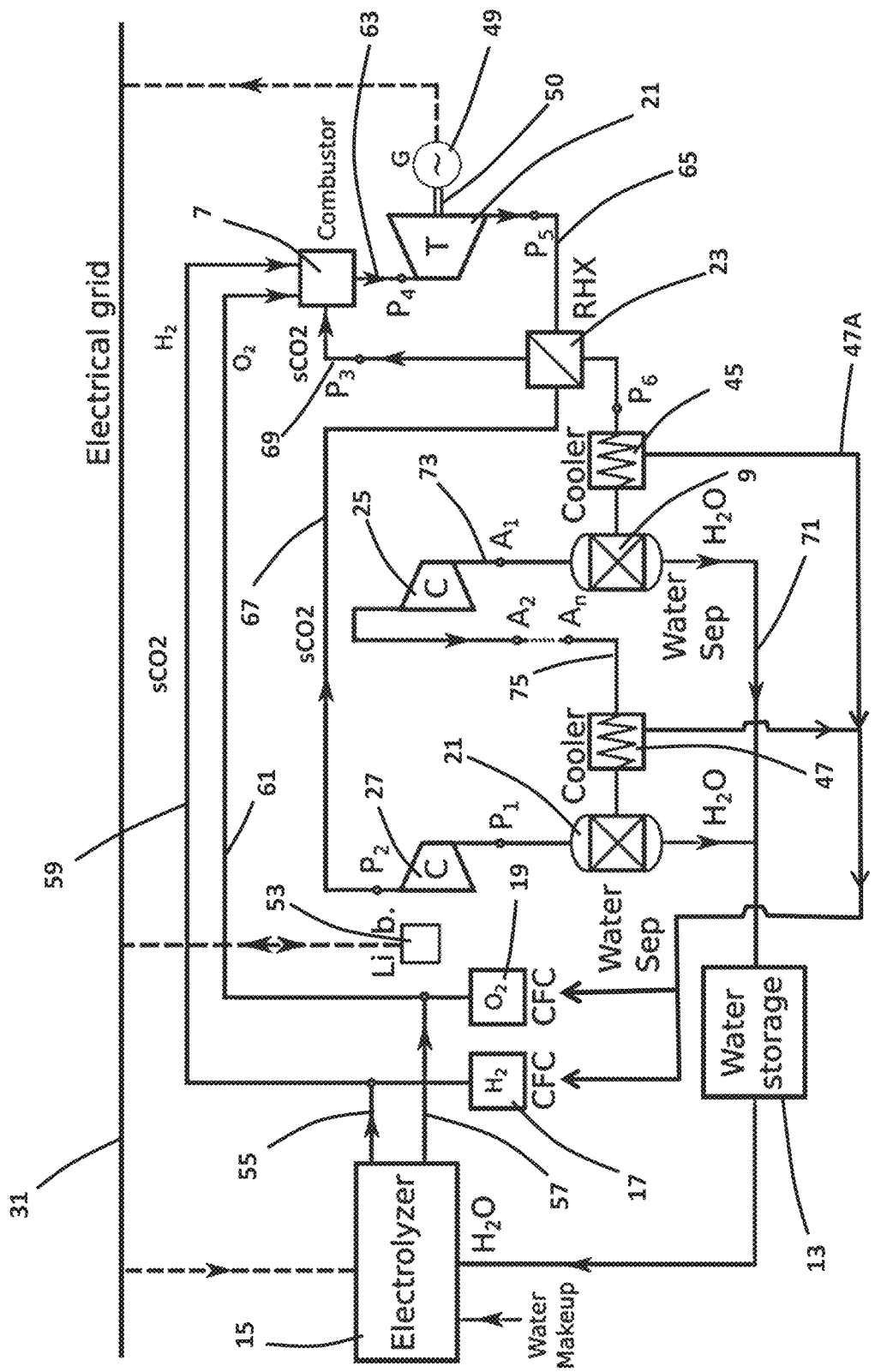
FIG. 2 is a detailed schematic of an energy storage system as shown in FIG. 1.

FIG. 2 shows the configuration of an energy storage and recovery system according FIG. 1 in greater detail. When the control circuitry 6 (FIG. 1) makes a determination that surplus power is available from the grid or local power sources, e.g., solar panels during a period of sunlight, the control circuitry switches on power from the grid to the electrolyzer 15. Electrolyzer 15 draws water from the water storage reservoir 13 and electrolyzes it with the power received to produce discrete hydrogen and oxygen gas, which are each transmitted to a corresponding CFC 17, 19 through conduits 55 and 57. The control circuitry causes the CFC units 17 and 19 to be cooled, causing the gases to each be adsorbed into the CFC retention material and stored there.

When the stored gases are to be recovered, the CFC units are heated, which causes them to release the gas stored in them into the area of the respective CFC. When the pressure of the released $H_2$ or $O_2$ reaches a predetermined working-pressure level, the hydrogen and oxygen are carried by conduits 59 and 61, respectively, to be combusted together and mixed with the turbine working fluid sCO2 in the combustor 7. The hydrogen burns with the oxygen, heating the sCO2 and producing a heated sCO2/$H_2O$ mixture that proceeds through conduit to turbine 21.

The turbine is driven by the high-pressure heated mixture and turns a shaft 50, or a gear or other driving mechanism, connected with generator 49. Generator 49 in turn outputs AC electrical current to the grid 31 to increase the power supplied through it to satisfy the demands of the electrical loads connected to it. The output of the generator also goes to power compressor pumps 25, 27 of the system, as will be explained below.

After passage through the turbine, the hot sCO2/$H_2O$ mixture is carried by an outlet conduit to heat exchanger 23, which extracts heat from the mixture. The heat exchanger 23 transfers that heat to sCO2 that is supplied to the other side of the heat exchanger 23 via conduit 67, and then, that heated sCO2 is cycled back to the combustor 7 via conduit 69.

After passing through the heat exchanger 23, the mixture then flows to cooler 45, which further cools the mixture. The heat removed from the mixture is in part released to an air cooler (not shown) that conveys the heat to the ambient environment, and in part the heat is used to heat a heat transfer medium, such as dried or dry air, that is flowed to the CFC units to assist in the further liberation of $H_2$ and $O_2$ from the CFC units. Because the CFC unit is a constant volume vessel, heat first helps to desorb the gas from the aerogel, and second, with the further addition of heat, the density decreases thus the pressure increases, and no additional compression system is required.

The further-cooled mixture then proceeds to water separator 9, which extracts a substantial portion of the water from the mixture, and supplies it back to the water storage reservoir 13 via conduit 71. The separator 9 may be a mushroom-type $H_2O$/sCO2 separator such as seen in the turbine of U.S. Pat. No. 10,787,963 B2 issued Sep. 29, 2020 to Amos et al., which is herein incorporated by reference.

The portion of the $H_2O$/sCO2 mixture that remains after water separation flows through conduit 73 to pump 25, which is powered by electrical power from generator 49, and increases the pressure of the cooled mixture. The cooler mixture then is transmitted by conduit 75 and cooled further by cooler 47, releasing more heat to the ambient air around the system or to another component of the system that requires heat. That cooled $H_2O$/sCO2 mixture has less water, but most of the water is extracted at this point by water separator 11, which is similar to water separator 9, and may be itself the only mushroom-type separator. The water separated is also sent via conduit 71 to reservoir 13, where it is reused for subsequent electrolysis power storage.

The remaining portion of the mixture after this second water removal is almost 100% sCO2 and can be used again as the working fluid for the turbine, except that it is cool and at a lower pressure than needed. Accordingly, it is carried to compressor pump 27 by a conduit. Compressor pump 27 increases the pressure of the sCO2 to the working-fluid pressure for the combustor part of the system, i.e., to a pressure of 200 atm or greater. The pressurized sCO2 is carried by conduit 67 to heat exchanger 23, where it is heated and then flows through conduit 69 to mix with the hydrogen and oxygen in the combustion chamber 7, repeating the cycle of the turbine process.

System Function

Figure 3:
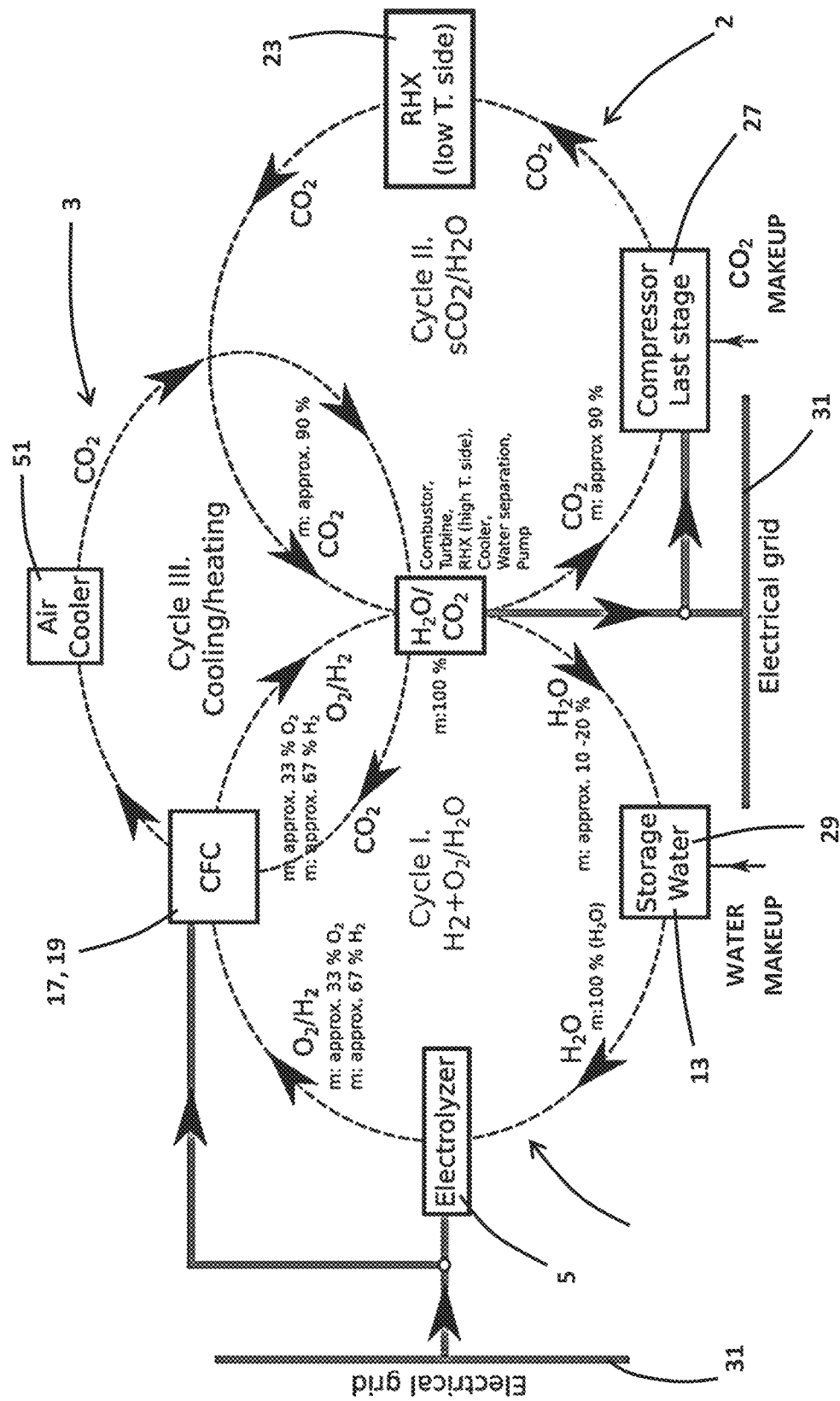
FIG. 3 is a diagram showing the operation of a system of storing electrical energy using hydrogen and oxygen electrolysis, storage, and combustion in a supercritical $CO_2$ turbine system.

The overall system is generally a closed, zero-emission system with an internal reusable supply of $H_2O$ that is used for the $H_2$ and $O_2$ separation, and is then replenished by combustion of the $H_2$ with the $O_2$. As best shown in FIG. 3, the overall system is comprised of two semi-closed and one open cycle (cooling of sCO2 power cycle and heating CFC storage).

Cycle I (fuel), indicated at 1, is the first semi-closed cycle, and is configured to separate $H_2$ from water by electrolysis, store the resulting $H_2$ and $O_2$, burn the $H_2$ with the $O_2$ in a hydrogen combustor, and then to separate the water combustion product from the $CO_2$ stream, after which the separated water is stored for re-use in electrolysis when needed.

Cycle II (power), indicated at 2, is the second semi-closed cycle and is designed to transfer and convert thermal energy from the combustion process to electrical power.

Cycle III (cooling/heating), indicated at 3, is the last cycle, and is an open cycle that interacts with the working medium of the ambient external air as a heat sink, and that cools the sCO2 stream of combustion mixture so as to remove $H_2O$ in the liquid phase from the sCO2 stream (gas phase), and also so as to transmit heat that causes, or aids in, the release of $H_2$ and $O_2$ stored in the CFCs.

Cycle I (Fuel)

Cycle I provides its cycle process using components shown in FIGS. 1, 2 and 3, i.e., an $H_2$ combustion unit 7, a water separation unit or units 9 and 11, a water storage system or reservoir 13, an electrolyzer 15, and cryogenic flux capacitors (CFCs) 17 and 19 that store the electrolysis products of hydrogen and oxygen at liquid-like densities without a need for liquefaction or high pressures. Cycle I also has a turbine 21, recuperative heat exchanger RHX 23, one or more compressor/pumps 25, 27, that, with the water separation units 9, 11 and the $H_2$ combustor 7 are shared by Cycles I and II. However, the main components of the Cycle I are the electrolyzer 15 and CFC storage system 17, 19.

During periods where power is to be stored, e.g., periods of high production of excess electrical current, the electrolyzer 15 is supplied electricity from the electrical grid 31 or power source, and it uses the excess electricity to separate $H_2O$ into $H_2$ and $O_2$. The electrolyzer 15 comprises an anode and a cathode that are separated by an electrolyte. There are several electrolyzer types that may be used in the system to produce $H_2$, including a polymer electrolyte membrane (PEM) electrolyzer, an alkaline electrolyzer, or a solid oxide electrolyzer. Particularly preferred for the electrolysis device is the electrolyzer sold by Siemens AG under the trade name Silyzer 300, a PEM electrolysis product with a double-digit megawatt range.

For short-term electrical storage for up to twelve hours, or a maximum of 24 hours, lithium-ion battery energy storage is more economical. Twelve hours is roughly the break-even point at which energy storage in the form of hydrogen becomes more economical. Short-term storage (less than 12 hours) of excess electrical power from the electrical grid 31 is accomplished using the lithium battery, which the system uses during system load to maintain the same energy transferred to electrical grid. During normal operation, the energy from the electrical grid or directly from generator is stored in the lithium battery 53. Longer-term storage relies on the $H_2$ and $O_2$ storage in the CFCs 17 and 19.

Consequently, the $H_2$ and $O_2$ gases typically need to be stored for 24 hours or more, which defines one of the parameters of storage technology employed.

The electrical circuitry 6 (FIG. 1) is connected with the electrolyzer 15 and the power grid 31. The electronic circuitry 6 monitors the level of electrical power production, and determines when it is appropriate to store excess electrical power in the grid 31 as $H_2$. When the power generation level of the power supply exceeds a predetermined threshold level for engaging power storage, or where the power output level exceeds the demand for electrical power by some threshold value, and when circumstances indicate that the surplus electrical power is to be stored for 12 hours or more, such as when the spot market price of electricity is low or even negative, the control circuitry 6 switches on the electrolyzer 15. The power for the electrolyzer 15 is supplied as electrical current from the electrical grid 31, and the power may be conditioned to conform to the electrical input requirements of the electrolyzer 15 if they differ from that of the power grid operation.

The electrolyzer requires the amount of 2.4 gallons (9 liters) of water to generate 1 kg of combustible hydrogen. A water buffer tank or reservoir 13 stores the water to be electrolyzed, and it provides temporary storage of the separated water from Cycle II prior to electrolysis. A mechanism 29 connected with the water storage 13 provides for the introduction of makeup water into Cycle I by an operator or automatically if more water is needed for the process.

The output of the electrolyzer is $H_2$ gas and $O_2$ gas, both of which need to be stored in the system. The most common storage technologies are high pressure gases and cryogenic liquids, but the system of the invention preferably employs a material-based storage system, specifically cryogenic flux capacitor (CFC) storage units 17 and 19.

CFC storage is based on physisorption of gas, and it can be used to store any gas, including $O_2$, $H_2$, $N_2$, Ar, or even natural gas, or other gases. At the heart of the CFC system of the preferred embodiment is a nanoporous aerogel, e.g., of boron nitride, and nanoporous materials exhibit very high surface to volume ratios. However, physisorption suitable for storage devices of the present system may be achieved by materials other than aerogels. For example, materials such as carbon nanotubes can also be employed for gas storage.

The gas molecules are bound to the surface of the CFC porous medium by van der Waals forces. Storage densities similar to liquids can be achieved by lowering the system temperature close to the boiling point of the respective gas. Although the densities are high, the fluid stays in the gaseous phase, which eliminates the need for latent heat removal. Furthermore, CFC operation pressure is moderate in pressure (comparable to ambient pressure) and CFC operation temperature is below the boiling point of the medium (cryogenic temperatures).

Figure 4:
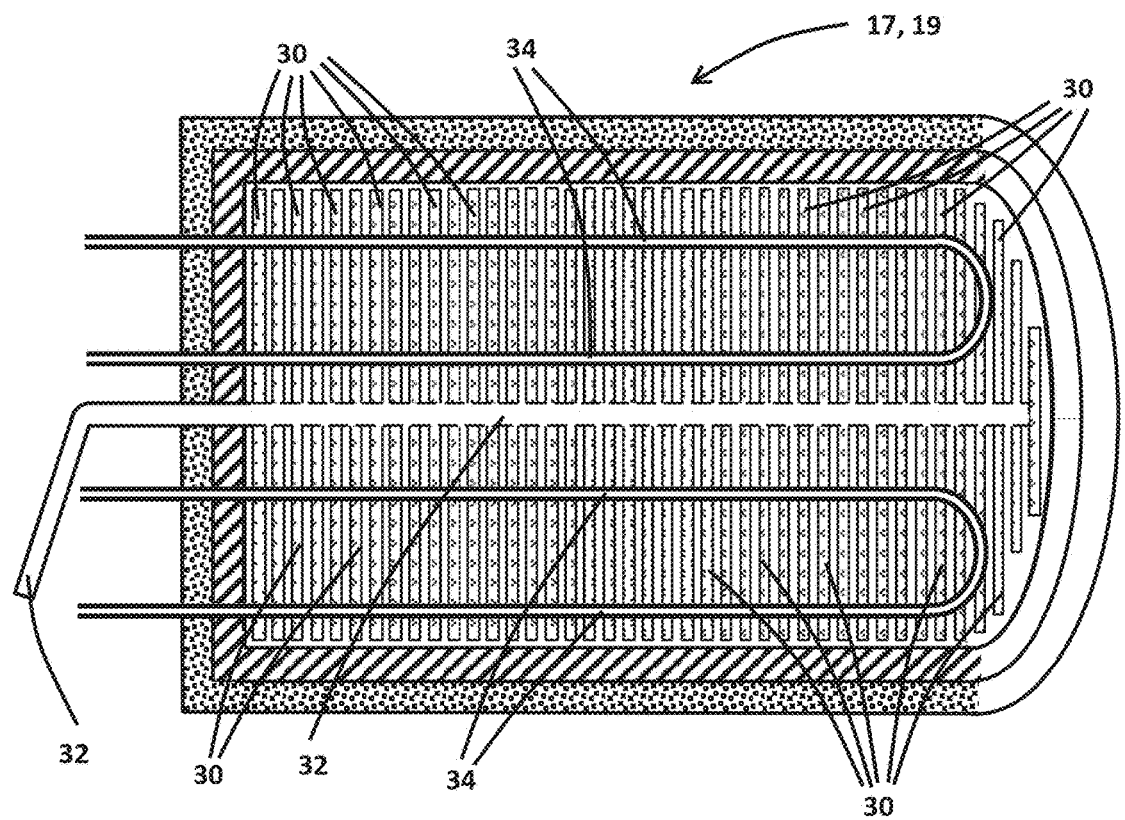
FIG. 4 is a center-line cross-sectional view of a cryogenic flux capacitor (CFC) gas storage device used in the system.

FIG. 4 shows the interior structure of a CFC storage device 17 or 19 in an axially cross-section view showing the gas-storing material in the CFC device. The same structure of CFC device is employed in the system for both the $H_2$ storage device and the $O_2$ storage device.

CFC units 17 and 19 have a housing wall 33 providing structural support for the pressure inside the CFC unit, surrounded by a layer of insulation, and aerogel sheets 30 tightly packed inside the housing 33. A conduit 32 communicates with and extends into the interior of the CFC unit and through the aerogel sheet materials in a pathway that allows for distribution of the gas throughout the aerogel sheet material 30. Gas is introduced through the conduit 32 into the interior of the CFC and contacts with the aerogel sheets 30 where it is adsorbed to them. Similarly, when gas is released from the aerogel sheets 30, the freed gas proceeds through the conduit 32 and out of the CFC. During the storage process, the aerogel sheet material 30 is cooled to encourage adsorption of the gas by supplying refrigerant or coolant through conduit passageways 34 defined in the aerogel material 30. During release of the stored gases, the aerogel material 30 is heated by supplying heated heat transfer medium, such as dried air or gas, through the passageways 34 so as to cause separation of the gas molecules from the aerogel 30.

Figure 5:
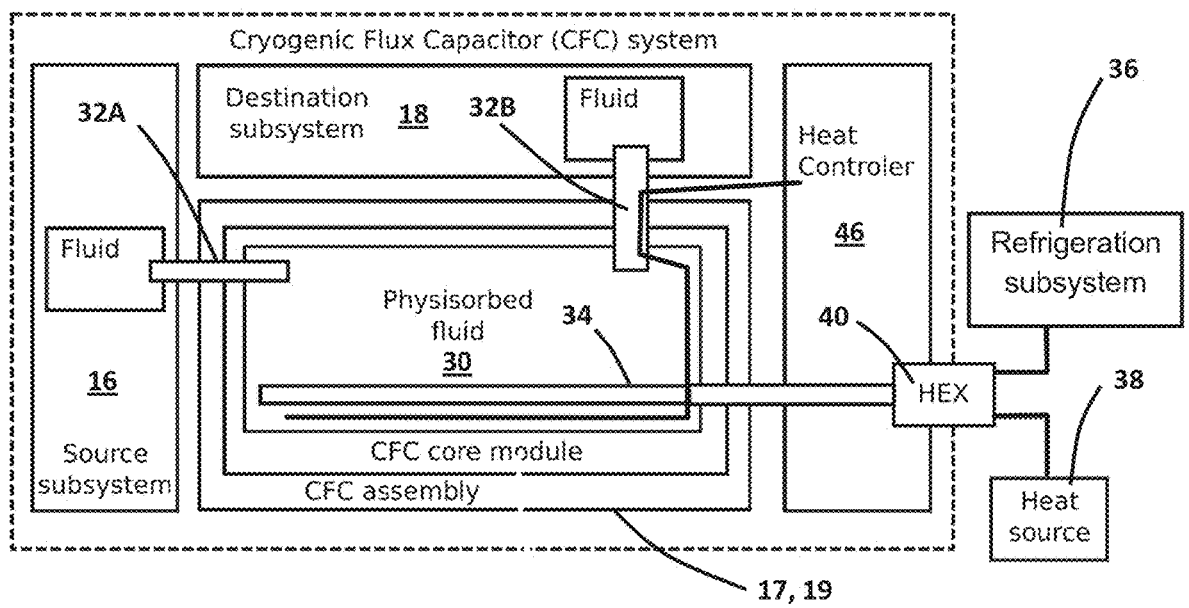
FIG. 5 is a schematic diagram of a CFC unit that may be used in the system.
Figure 6:
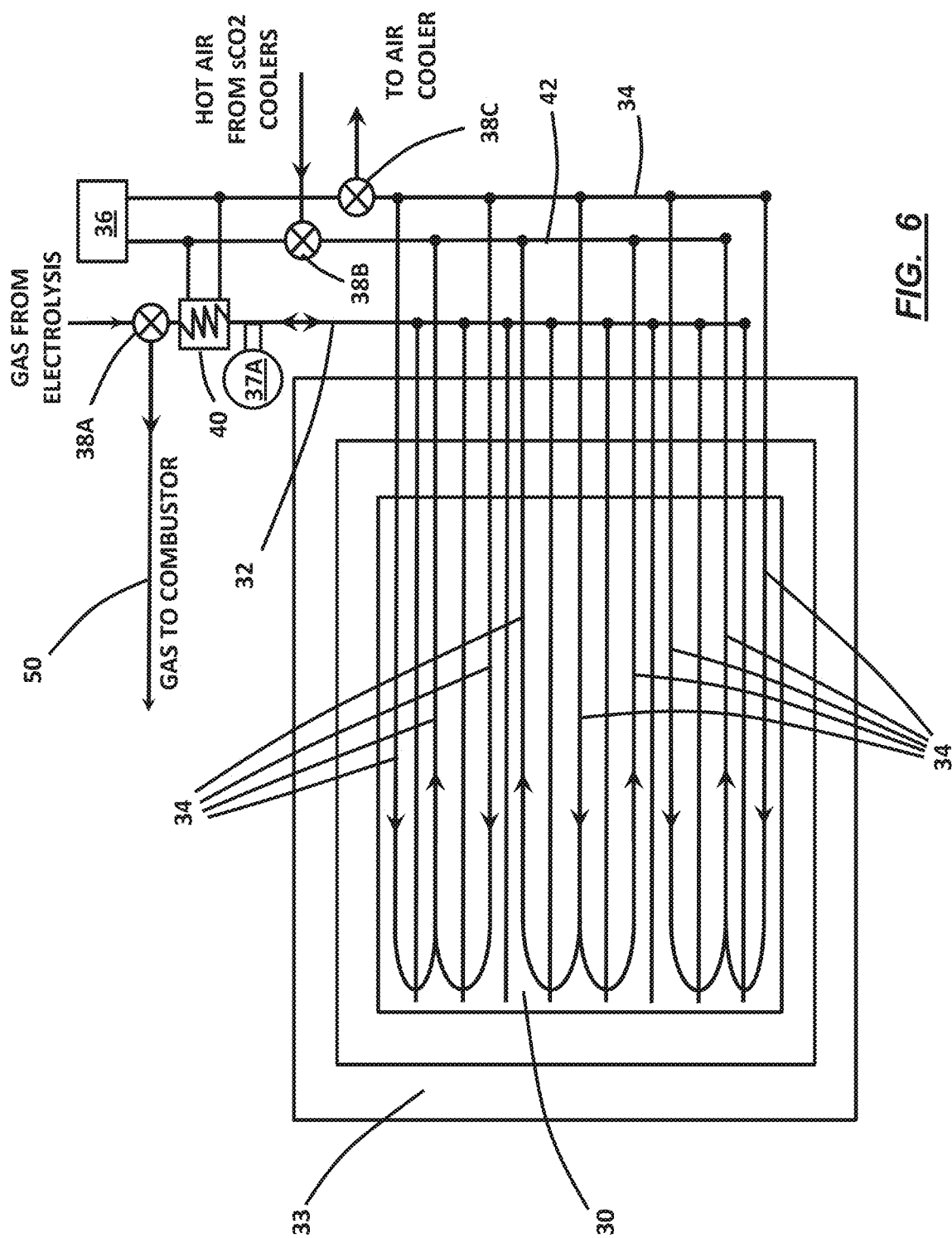
FIG. 6 is another schematic diagram of a CFC unit as shown in FIG. 5, showing the valves and connections of the CFC unit to the turbine system.

FIG. 5 schematically illustrates the operational structure of a CFC device within the system. FIG. 6 schematically illustrates the CFC unit similarly to FIG. 4, with individual control valves shown. The CFC device 17 or 19 shown is the same, irrespective of whether it is used for $H_2$ or $O_2$.

Referring to FIG. 5, heat controller 46 is part of control electronics 6 (FIG. 1), electronically controls the process of storing and discharging the gas in the respective CFC unit 17 or 19 by controlling supply of coolant or heated substance, e.g., air, to the CFC unit using a heat exchanger 40 that extracts heat from $H_2$ or $O_2$ being cooled down to storage temperatures in the CFC unit, or by supplying heated gas or fluid from heat source 38, which may be air that is heated with heat from cooling of the heated sCO2 of the turbine combustion process, or from another source of heat, such as an electrical heating system powered by the grid 31 or lithium battery 53, especially when recovery of energy from the stored $H_2$ and $O_2$ is just starting and there is no heat available yet from the combustion.

To store the $H_2$ and $O_2$ resulting from the electrolysis step, the $H_2$ or $O_2$ gas to be adsorbed is supplied by source subsystem 16 (meaning a connection with electrolyzer 15) providing the gas, which may be in a fluid state, via an input 32A to the CFC unit 17, 19. As best shown in FIG. 6, to store gas from the electrolyzer, the controller 46 opens valve 38A that allows flow of the gas from the electrolyzer to intake the $H_2$ or $O_2$ gas into the CFC unit, where it contacts the aerogel material 30. At the same time, the heat controller 46 causes refrigerant charging unit 36 to provide coolant, e.g., liquid nitrogen, that flows to heat exchanger 40, which cools the gas entering the CFC unit through conduit 32. Controller 46 also opens valves 38B and 38C allowing the coolant (preferably $N_2$) to flow through tubes 34 within the CFC storage device so as to lower the temperature within the CFC storage tank, after which the coolant then flows out of the CFC tank and returns to be cooled again in refrigeration system 36.

As the temperature in the CFC unit 17, 19 decreases, more and more $H_2$ or $O_2$ from the electrolysis process is adsorbed onto the CFC storage material 30 as physioadsorbed fluid.

That continues until the CFC is filled to its capacity, or until the supply of gas stops. The system detects that the CFC unit is full when a pressure sensor and mass-flow meter 37A communicating with and sensing pressure in conduit 32 does not detect any drop in the internal pressure in the conduit and CFC unit, which is at about 100 bar at 77 degrees K.

The $H_2$ and $O_2$ can be stored in the CFCs for more than 24 hours. The storage parameters are ambient pressure for both media, with a temperature of 95 degrees K for $O_2$, and 25 degrees K for $H_2$. Higher temperatures, e.g., 77 degrees K, can be used for storage, with increased pressure offsetting reduced densities due to the elevated temperatures.

To withdraw the stored gas from the charged CFC, conversely, the desorption process starts when the CFC system temperature is increased. This is done by the controller circuitry 46, which opens valves 38B so that there is an introduction of heated fluid or gas into the heating/cooling passages 34 in the aerogel material 30 in the CFC unit. The heated fluid or gas may be or air or some other thermal conduction fluid, and it receives heat from a heat source 38. At start of the desorption process, the heat source 38 is heated with heat supplied by an electrical heater powered by the grid 31 or by lithium battery 53, which is used until combustion of the released $H_2$ and $O_2$ begins and there is sufficient heated combustion mixture to provide heat to continue the desorption process. Once the combustion and turbine operation is under way, the CFC unit is heated with heat created by the turbine combustor and the burning of the $H_2$ gas in the combustor of the turbine that is extracted from the $H_2O$/sCO2 combustion mixture by coolers 45 and 47 and imparted to air from the environment that has effectively all the water therein removed, because the CFC material is very cold, and there would be a possibility of condensation or even freezing in the CFC unit if there were water present in the heating fluid. The heated fluid after passing through the CFC unit flows through conduit 34 to valve 38C, which is opened to cause flow of the heated air or fluid to the air cooler 51, releasing the excess heat still in it.

As the temperature in the CFC retention material increases, the stored gas breaks loose from its weak bonding with the storage material and starts populating the pores of the CFC retention material rather than sticking to the adjacent surfaces. The pressure within the storage tank then increases if the system is free of leaks. As the pressure increases, the CFC unit retains the released gas in its tank until it reaches a predetermined threshold pressure level for release of the gas, which, in the preferred embodiment, is at least 150 atm, and most preferably at 200 atm or more. Once the threshold release pressure is reached, the controller 46 opens the valve 38A and gas flows though CFC outlet conduit 32B to destination subsystem 18, from which the released $H_2$ or $O_2$ is supplied to the turbine for combustion and conversion back to electrical power.

Referring to FIG. 6, the detail of the system for loading or discharging gas from the CFC units 17, 19 is shown.

During storage, conduit 32 carries $H_2$ or $O_2$ gas from the electrolyzer 15 to the associated CFC device through valve 38A which is opened by electrical control circuitry to permit passage of the gas into the CFC unit. The gas then passes through heat exchanger 40, which cools the gas by heat transfer to coolant of the refrigerant system 36. Coolant is also carried through coolant conduit or tube 34 into the CFC aerogel material 30, where it cools the material to adsorb gas, and carries away exothermic heat from the adsorption process through connection to output conduit 42, which communicates with the refrigerant system 36 via valve 38B, which is opened in the appropriate direction during the storage phase to allow flow to the refrigerant system 36. The storing process continues with cooling facilitating adsorption until the supply of gas is cut off (by valve 38A or elsewhere) or until the CFC unit material 30 is assessed as full.

To discharge the CFC unit, the heat controller 46 turns off the refrigeration system 36 and causes valve 38B to open to admit heated gas carrying heat taken by a heat exchanger from the sCO2 working fluid of the turbine when that is available, or heat from an electrical heater powered by the grid 31 when the sCO2 heat is not available. The heated air flows though conduit 42 and through the passageways in the aerogel material 30, heating it. The heated air then flows to conduit 34 and out of the system through valve 38C, which is opened so as to direct the heated air to air cooler 51.

The increased temperature of the CFC material 30 causes the material to release the adsorbed $H_2$ or $O_2$ from the CFC to flow through conduits 32 in the reverse direction from the storing direction. The gas passes through the heat exchanger 40 and through valve 38A, which is switched to permit flow from conduit 32 to outlet conduit 50, which carries the released $H_2$ or $O_2$ gas, respectively, to the combustion chamber of the turbine.

Figure 7:
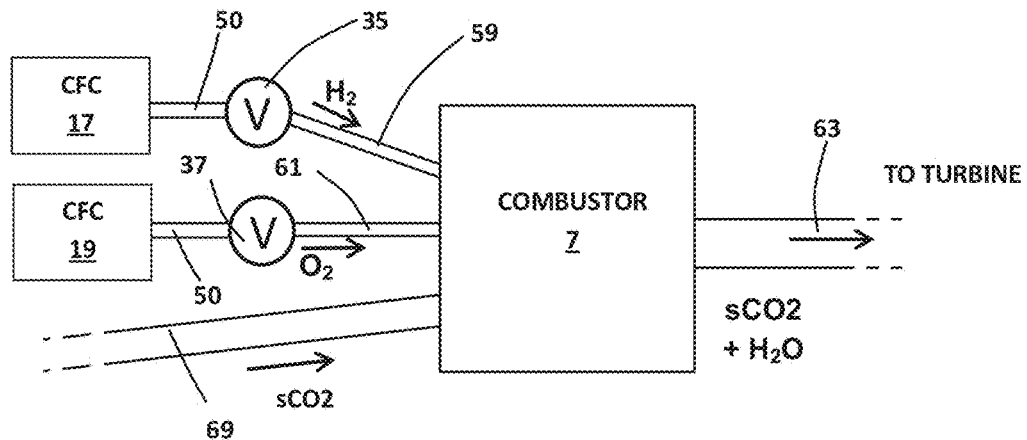
FIG. 7 is a diagram showing the connection of the $H_2$ and $O_2$ CFC units to the sCO2 system.

Referring to FIG. 7, when the $H_2$ and $O_2$ are released from the associated CFC material, those gases flow through the associated outlet conduit 50, but the flow of those gases is blocked by valves 35 and 37. Valves 35 and 37 do not permit passage of the gases until their pressure reaches a predetermined minimum threshold pressure, e.g., 200 atm, for insertion into the sCO2 working fluid of the turbine. When that happens, the $H_2$ and $O_2$ are each carried by respective conduits 59 and 61 leading to the combustion chamber 7, where they are mixed in a burner in the chamber and combustion of the $H_2$ with the $O_2$ occurs with the presence of sCO2 from conduit 69, resulting in formation of a heated mixture of $H_2O$ and sCO2, which passes out of the combustor 7 through a connecting passage 63 to the turbine.

The function of valves 35 and 37 may also be performed by the control circuitry by closing valve 38A so that the $H_2$ or $O_2$ gas released from the CFC units is not permitted to flow out of the CFC unit until the control circuitry determines from signal data input from pressure sensor 37A that the pressure of the gas has reached a predetermined threshold pressure level for release to combustion.

Figure 9:
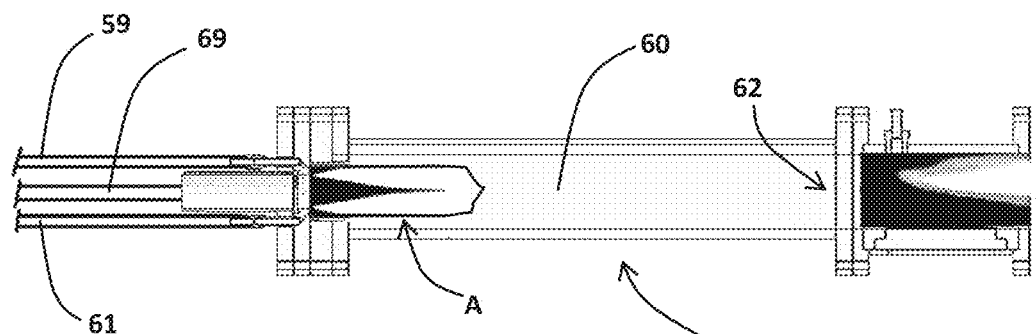
FIG. 9 is a view of an alternate embodiment of the mixing/combustion system.

A possible design of the combustion chamber, where the gases mix and the $H_2$ burns with the $O_2$ is shown in FIG. 9, wherein the combustion chamber 60 is cylindrical and shown partly cut-away at A, showing the mixing and combustion of the $H_2$ and $O_2$ gases inside. The resulting combustion mixture of sCO2 and water passes through an outlet 62 to proceed to the turbine. The discharge pressure is controlled by modulating the mass flow rate detected by pressure/mass-flow sensor 37A and by the heat controller 46 changing the heating temperature of $H_2$ and $O_2$.

Figure 8:
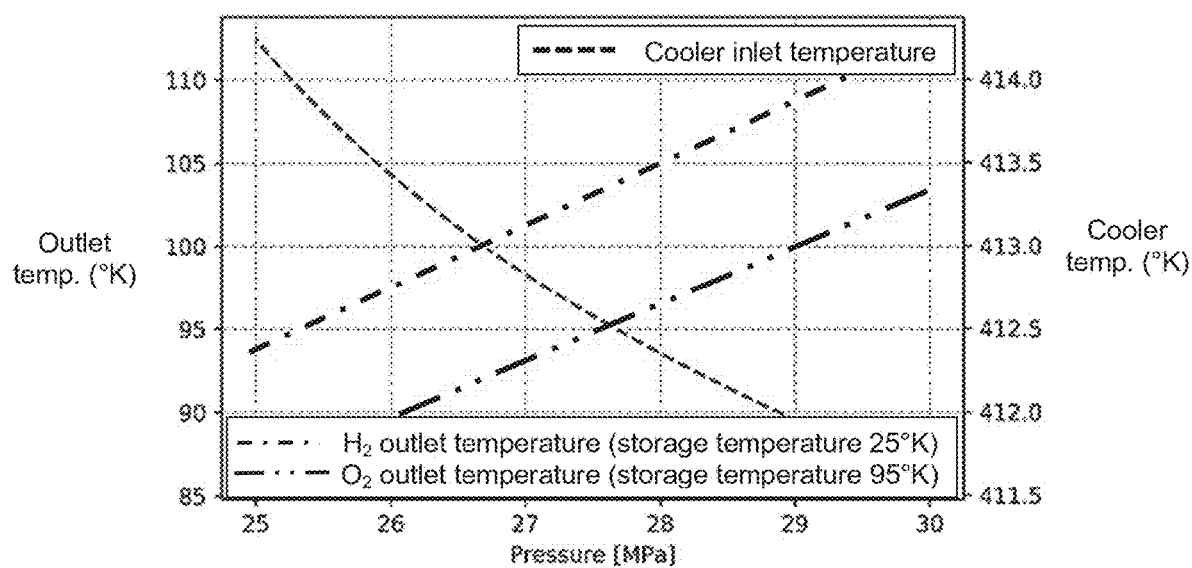
FIG. 8 is a graph showing the isovolumetric process in the cryogenic flux capacitors for $O_2$ and $H_2$.

FIG. 8 shows outlet temperatures of the CFC units for different $H_2$ combustor inlet pressures (left side) and the maximal cooling temperature which can be used to heat $H_2$ and $O_2$ in the units CFC (right side of graph). The heat for releasing the $H_2$ and $O_2$ from the CFC units is preferably taken from a cooler 45 or 47 of the sCO2 power cycle, and the power cycle is configured to keep the minimum temperature of the cooler above the CFC outlet temperature. Consequently, the heat derived from cooling of the sCO2 power cycle cooling temperature (energy) is used to heat the CFC units and release the adsorbed $H_2$ and $O_2$ without needing any additional energy to be added to drive that process.

In addition to heating to cause release of the $H_2$ and $O_2$ from the CFC devices 17 and 19, the $O_2$ and the $H_2$ must be heated to be at an operating temperature for combustion and operation of the turbine with supercritical sCO2 working fluid. This is accomplished through isovolumetric heat addition (i.e., volume V is constant). During this process, the $H_2$ and $O_2$ are heated with heat from the sCO2 cooler 45 and/or 47 (Cycle III). The $H_2$ and $O_2$ density of operation conditions is constant and equal to the saturation density of storage parameters in the CFC units. Based on this definition, the operation temperature can be calculated according to Equation 1, below:

$$T_{out} = \frac{P_{out}}{R_{substance} * \rho} \qquad (1)$$

where, $\rho$ is the saturation density for the storage parameters and $P_{out}$ is the operating pressure of the combustor, based on the sCO2 power cycle.

Cycle II (Power)

Cycle II extracts electrical power from the combustion of the $H_2$ with the $O_2$ released from the CFC units 17 and 19. The second semi-closed cycle is Cycle II (power) cycle transfers and converts thermal energy from the combustion process into electrical power. Cycle II involves $H_2$ combustor 7, a turbine 21, recuperative heat exchanger (RHX) 23, one or more coolers 45, 47, and at least one $H_2O$ separation unit 9, 11, and one or more compressors and pumps 25, 27.

Cycle II uses the results of the combustion of the hydrogen and oxygen obtained from the storage devices with each other in the combustion chamber 7 so as to form water that is in a heated mixture with supercritical $CO_2$, which is the operating fluid of the turbine system 21. The turbine system 21 receives the heated supercritical $CO_2$ mixture and produces from it a mechanical energy output, e.g., a rotating shaft 50 or gear, that is converted by generator 49 into electrical current that is output from the system, preferably to the grid 31.

The water produced by the reaction of the hydrogen and the oxygen is separated from the mixture and transmitted to the reservoir 13 containing the internal water that is operatively associated with the electrolysis device 15 where it is re-used in subsequent hydrogen storage cycles. The method is in this way conducted in a closed system that does not intake any air from outside the system and recycles the water from the combustion as the internal water that is electrolyzed.

Also, during this process, heat is extracted from the mixture of water with the supercritical $CO_2$ or from the water separated from the sCO2 with heat exchangers 23, 45, or 47. The heat from heat exchanger 23 is transferred back to the sCO2 returning to the combustion chamber 7, while at least a portion of the extracted heat from the coolers 45 and 47 is used to heat dry air that flows through a conduit 47A between the coolers and the CFC unit 17 and is applied to the CFC unit 17 for the hydrogen so as to cause release of the hydrogen from it, and at least another portion of the heat from the coolers 45 and 47 is used to heat dry air that flows through conduit 47A between coolers 45 and 47 and CFC unit 19 and is applied to the CFC unit 19 retaining the oxygen so as to cause release of the oxygen. The heat supplied by conduit 47A also is used to raise the temperature of the released $H_2$ and $O_2$ to a temperature where they can be introduced to the combustion chamber 7 and the sCO2 working fluid.

The sCO2 power cycle of the type used in the invention is used in many applications, such as nuclear power plants (secondary/tertiary loop), solar power plants, geothermal power plants, or application to fossil fuel power plants (direct-fired systems), and waste heat recovery systems. As set out in Table 1, the sCO2 power cycle can be scaled and employed for a heat source with a temperature varying between 100° C. to 1500° C., generating power up to as much as 600 MW in specific applications.

TABLE 1

Parameters for applications of sCO2 power cycles

| Application | Power [MWe] | Operation Temperature [° C.] | Operation Pressure [MPa] |
| --- | --- | --- | --- |
| Nuclear | 10-300 | 350-700 | 20-35 |
| Fossil fuel (syngas, natural gas), indirect and direct-fired sCO2 systems | 300-600 | 550-1500 | 15-35 |
| Geothermal | 10-50 | 100-300 | 15 |
| Concentrating solar power | 10-100 | 500-1000 | 35 |
| Waste heat recovery | 1-10 | 200-650 | 15-35 |

The sCO2 system described here relates to direct and indirect fired sCO2 systems. One exemplary unit of such a system was built under the lead of SwRI (Southwest Research Institute) in the STEP (Supercritical Transformational Electric Power) project, which has demonstrated the capability of an indirect-fired sCO2 10 MWe power system. Another unit based on the Allam cycle configuration (direct-fired) was built in La Porte, Tex. with 50 MWth net power. Both projects use the heat generated during the combustion of natural gas or syngas with very high turbine inlet temperature (TIT). The STEP project encompasses two system configurations, the first configuration being a closed simple recuperated cycle with TIT at 774K, and the second configuration is a closed recompression cycle technology with TIT at 988 K. The Allam cycle-based sCO2 power plant in LaPorte, Tex. is a direct-fired configuration with an operating temperature up to 1431 K and with an operating pressure of 30 MPa. Irrespective of the particular system configurations, the foregoing two approaches are very efficient.

An example of a potential, utility-scale, direct-fired sCO2 power plant configuration can be found in Table 2, reported in R. Allam, "Demonstration of the Allam Cycle: An Update on the Development Status of a High Efficiency Supercritical Carbon Dioxide Power Process Employing Full Carbon Capture", Energy Procedia, Volume 114, 2017, Pages 5948-5966.

Figure 10:
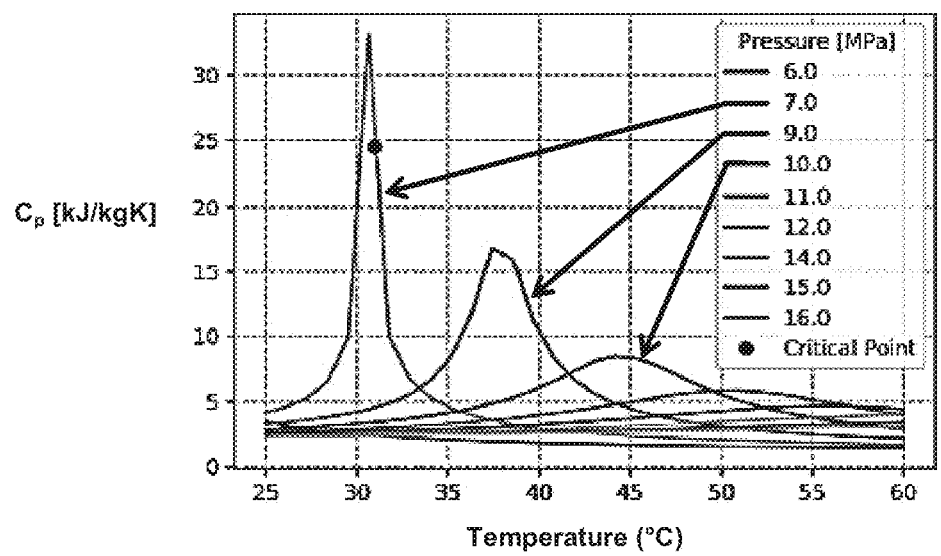
FIG. 10 is a graph showing the variation of specific heat of $CO_2$ based on temperature and pressure.
Figure 11:
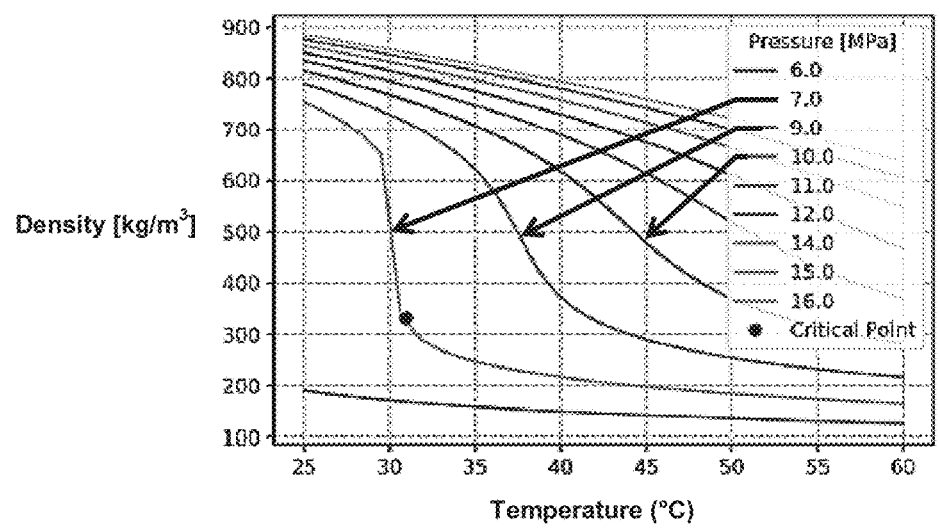
FIG. 11 is a graph showing the variation of the density of $CO_2$ based on temperature and pressure.

For the operation of the sCO2 system of the invention, in the area of the coolers 45 and 47, and the compressors 25 and 27, the system preferably has the $sCO_2$ at a temperature and pressure in the region of a critical point at which the properties of $CO_2$ near the critical point change dramatically, which influences the performance of the components, especially the compressor and cooler. The variation of the specific heat of $CO_2$ around the critical point is seen in FIG. 10, and the variation in density is shown in FIG. 11. Order-of-magnitude variations in fluid properties can occur within a narrow temperature window less than 10 degrees K, and the compressors and coolers of the sCO2 system preferably operate in or near that window, e.g., at a pressure between 6 and 91 MPa, preferably about 7 MPa, and at a temperature between 30 and 35 degrees C., or about 32 degrees C.

Those property changes of $CO_2$ also have an effect on the turbine and recuperative heat exchanger, primary heat exchanger, or combustor of the system. A possible drawback is the size of the heat exchanger used in the system, which is significantly larger compared to other systems with the same net power output (e.g. steam, helium). However, the size of the heat exchangers can be reduced by optimizing the operating parameters and cycle layout selection.

In the present invention, although the sCO2 system is a direct-fired sCO2 power cycle with a hydrogen-fuel combustor, it does not generate $NO_x$ because the combustion uses the stored $O_2$, and not air (i.e., air containing nitrogen). Because the combustion proceeds in the substantial or complete absence of nitrogen, the product of combustion is only heat and water ($H_2O$) derived from the combustion of hydrogen with pure oxygen in the presence of sCO2. The system of the invention has similar operation parameters and net power to current direct-fired sCO2 power cycles, such as set out in Table 2 below, which shows operation parameters for oxy-combustion direct-fired sCO2 power cycles, maximal operation pressure can be up to 30 MPa. The operation pressure for the direct-fired sCO2/H2 power system of the system here is in the range of 25 to 30 MPa.

TABLE 2

| Net power output | 303 | MW |
| --- | --- | --- |
| Natural gas thermal input | 511 | |
| Oxygen consumption | 3555 | MT/day (contained) |
| Turbine outlet flow | 923 | kg/s |
| Turbine inlet condition | 30/1431 | MPa/° K. |
| Turbine outlet condition | 3/1000 | |
| Oxygen plant (ASU) power | 56 | MW |
| CO2 compression power | 77 | |

Oxy-Combustion Direct-Fired sCO2 Power Cycle Operation Parameters

Cycle II, as a gas-based power cycle with the sCO2 as a working medium, has many advantages compared to steam water or helium power cycle.

An sCO2 power cycle can be indirect-fired (closed system) or direct-fired (semi-closed systems). For indirect or direct-fired configurations, there are several different cycle layouts that increase the main advantages or benefits of the sCO2 power system. The typical cycle configuration for an indirect sCO2 cycle is a simple Brayton sCO2 cycle and a re-compression cycle or dual expansion cycle and Kimzey cycle for multi-heat source systems. The typical cycle configuration for the direct-fired oxy-combustion sCO2 power cycle is the Allam cycle, described in, e.g., R. J. Allam, "The Oxy-Fuel, Supercritical $CO_2$ Allam Cycle: New Cycle Developments to Produce Even Lower-Cost Electricity From Fossil Fuels Without Atmospheric Emissions", *Proceedings of the ASME Turbo Expo* 2014: *Turbine Technical Conference and Exposition. Volume* 3B: *Oil and Gas Applications; Organic Rankine Cycle Power Systems; Supercritical CO2 Power Cycles; Wind Energy*, Düsseldorf, Germany, Jun. 16-20, 2014, V03BT36A016, ASME https://doi.org/10.1115/Gt2014-26952; see also J. Marion, "The STEP 10 MWe sCO2 Pilot Demonstration Status Update" in Proceedings of the ASME Turbo Expo 2020: Turbomachinery Technical Conference and Exposition. Volume 11: Structures and Dynamics: Structural Mechanics, Vibration, and Damping; Supercritical CO2.Virtual, Online Sep. 21-25, 2020, V011T31A002, ASME, https://doi.org/10.1115/GT2020-14334.

One of the main advantages of an sCO2 power cycle is in its high efficiency for higher operating temperature (turbine inlet temperature, TIT), typically above 450° C. The direct-fired sCO2 cycle is therefore preferred for the power generation system in the present invention, because a typical temperature for an oxy-combustion system is around 1400° K (see Table 2) or even higher. The TIT limitation is due to material parameters and turbine blade cooling, although turbine cooling enabled by additive manufacturing have pushed operating temperature limits further up. See, e.g., L. Calderon, "Adiabatic Film Cooling Effectiveness of a LAM Fabricated PorousLeading Edge Segment of a Turbine Blade." *Proceedings of the ASME Turbo Expo* 2018: *Turbomachinery TechnicalConference and Exposition. Volume* 5B: *Heat Transfer*, Oslo, Norway, Jun. 11-15, 2018. V05BT21A004. ASME. https://doi.org/10.1115/GT2018-77114; M. Otto, "Heat Transfer in a Rib Turbulated Pin Fin Arrayfor Trailing Edge Cooling", ASME, *J. Thermal Sci. Eng. Appl.* April 2022; 14(4): 041012. https://doi.org/10.1115/1.4051766; B. Ealy, "Characterization of Laser Additive Manufacturing-Fabricated Porous Superalloys for Turbine Components." ASME, *J. Eng. Gas Turbines Power*, October 2017; 139(10): 102102. https://doi.org/10.1115/1.4035560.

Figure 12:
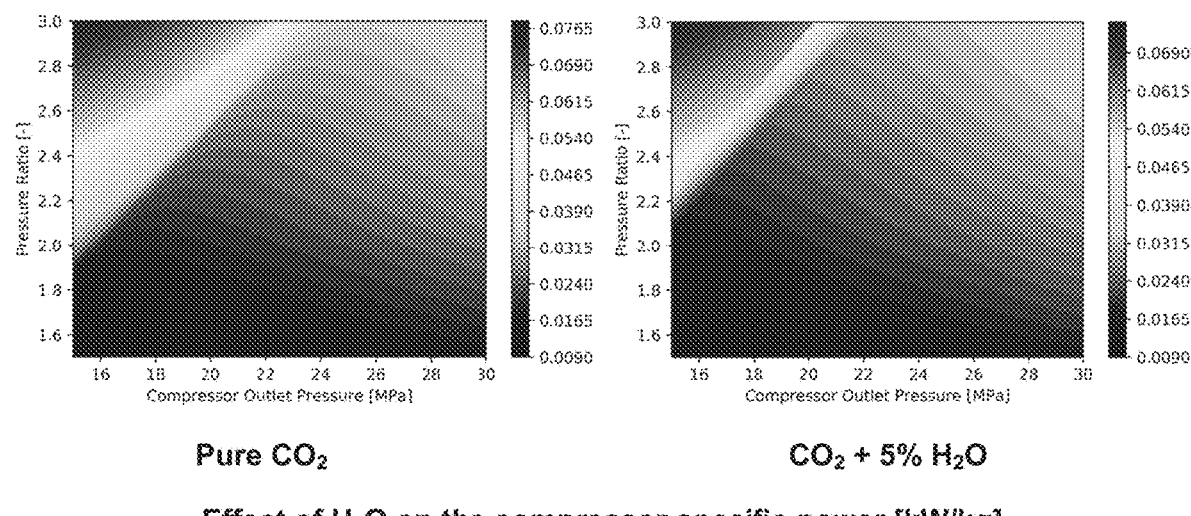
FIG. 12 is a graph showing the effect of $H_2O$ presence in sCO2 on the compressor specific power.

Another advantage of the sCO2 power cycles is their compact size compared to steam or helium Brayton cycles. The compressor and the turbine of the sCO2 power cycles are significantly smaller due to the high operating pressure. The required compressor work reduces operation near the critical point of $CO_2$. Consequently, the compressor of the sCO2 power cycle is operated near the critical point and in the subcritical and supercritical region. The system does not enter into the dome (gas-liquid phase). However, impurities in $CO_2$ may have an effect on the compressor work and the critical point. For example, FIG. 12 shows a comparison of compressor output pressure for pure sCO2 with the compressor output pressure for sCO2 with 5% $H_2O$, determined for 1 kg/s. The presence of water in the mixture has an effect on the compressor efficiency, and therefore should be reduced as much as possible before the mixture reaches the compressor.

The transmission of the heated sCO2/$H_2O$ mixture to turbine 21 causes it to rotate shaft 50, or a gear that imparts the mechanical energy from the turbine, to generator 49, which converts that energy to electrical current, preferably AC current, that is supplied to the electrical grid 31, and that is also partially used to power the compressors 25, 27.

In contrast to the turbine and compressor, the size of the heat exchangers of the present system is significantly larger compared to other systems, although the heat exchanger's size can be optimized by operating parameters, design and cycle layout, and type selection (cycle layout, design).

Referring to FIG. 2, the compressor is preferably divided into two or more stages, and several compressor stages in series can be included in the system between points $A_1$ and $A_n$, which compress the working medium from very low operation pressure (approx. 3 MPa and higher) on the hot side to very high operation pressure on the cold side (20 MPa and higher). The cooler 45 and the water separation unit 49 are used to remove $H_2O$ from the $CO_2$, and are part of each stage.

The cooler 45, 47 is divided into two parts. The first part is directly connected by conduit 47A to the CFC systems 17, 19 and supplies heat to them to release the $H_2$ and $O_2$. In the first part, the heat is transferred directly from the sCO2 stream. In the second part, the sCO2 stream is cooled to near the critical point of CO2 through an air cooler. The compressors 25, 27 are each separate units driven by a respective electric motor.

The electric motor is connected to and powered by the electrical grid 31 (during load operation, when the grid is overproducing power) and is connected to and powered by generator 49 (during "normal" operation, when the hydrogen from the CFC unit is being burned). The turbine-driven generator 49 is connected to the electrical grid 31 during normal operation and provides it with power derived from the stored $H_2$ and $O_2$.

Figure 13:
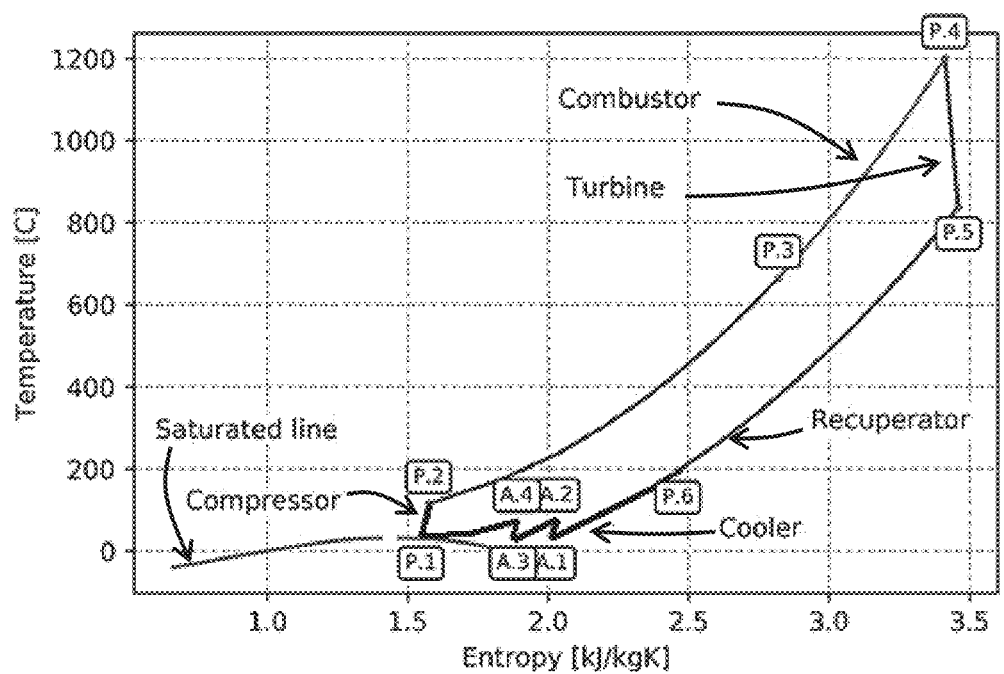
FIG. 13 is a temperature/entropy diagram of the direct-fired sCO2 cycle.
Figure 14:
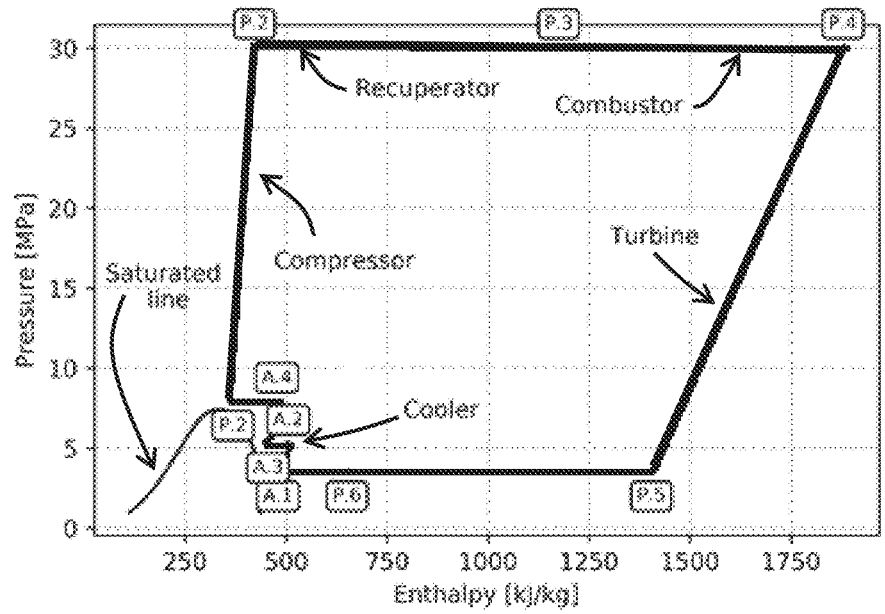
FIG. 14 is a pressure-enthalpy diagram of the direct-fired sCO2 cycle.

FIG. 13 is a temperature-entropy (T-S) diagram of the direct-fired $H_2$/sCO2 cycle, and FIG. 14 is a pressure-enthalpy P-H diagram of the cycle, from which parameters of the cycle of the system can be seen through the combustion and derivation of energy of the stored $H_2$ and $O_2$. Points $P_1$ to $P_6$ and $A_1$ and $A_2$ in the graphs of these figures correspond to points in the power cycle identified in FIG. 2. Points $A_3$ and $A_4$ in the graphs refer to points between additional compressors in the cycle between points $A_2$ and $A_n$ in FIG. 2. The temperature of the cycle ranges from a maximum at 1,200 degrees C. after combustion down to a minimum of about 20 to 30 degrees C. after cooling. The pressure ranges from a maximum of 30 MPa down to a minimum pressure in the cycle of 3 to 4 MPa.

Referring to FIG. 3, the overall system is semi-closed system with direct connection to Cycle II, which has several components described above with different operation parameters for the working medium. The working medium is not a 100% pure substance, i.e., pure sCO2, but is rather a mixture of sCO2 and $H_2O$, as well as occasional traces of other substances.

Nonetheless, the gas stream is mainly $CO_2$, which is the main working fluid in all components in the power cycle. In the system herein, the second-largest substance by species concentration is $H_2O$. Other substances that may be present in limited amounts in the sCO2 are $O_2$ and $H_2$, which occur only if the combustion process is incomplete, or if there is a mismatch in the targeted equivalence ratio of $H_2$ to $O_2$, where there are higher amounts of $O_2$ or $H_2$ than necessary.

The combustor or combustion chamber 7 is the main common component for both Cycle I and II. The $H_2$ is burnt in the chamber 7 with $O_2$ according to the following reaction mechanism and the resulting energy release, given that the reaction product remains in gaseous form (LHV):

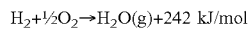

$$H_2 + \tfrac{1}{2}O_2 \rightarrow H_2O(g) + 242 \text{ kJ/mol}$$

The combustion reaction $H_2$—$O_2$ can provide a working temperature beyond 3,000 degrees C. Based on this, the maximal TIT is not limited from the thermodynamic point of view. However, the temperature limitation of the combustor is related to the material limit. The maximal TIT is fixed for the present system at 1,473 degrees K (1,200 degrees C.).

Figure 15:
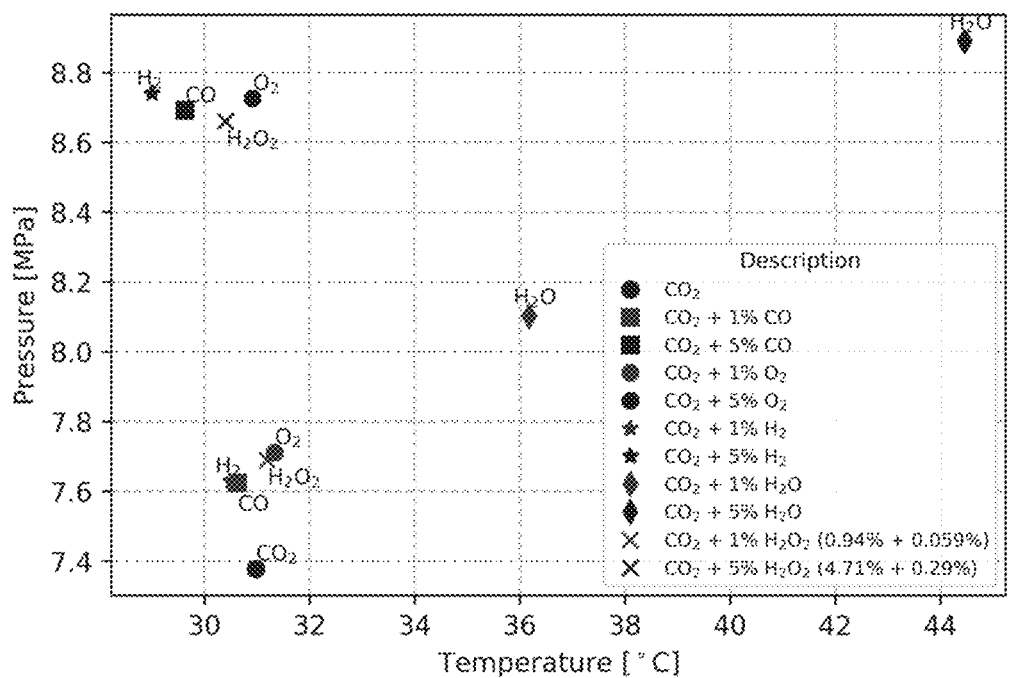
FIG. 15 is a graph showing variation in the temperature and pressure of the critical point of CO2 and of CO2 mixed with other substances.

There are considerations with respect to the combustion products that should be addressed in the system according to the invention, because if the combustion of the $H_2$ with the $O_2$ is not balanced, it may affect the system efficiency. FIG. 15 shows the effect of varying concentrations of $H_2O$, $H_2$, and $O_2$ on the critical point of the $CO_2$ on the main CO2 stream properties. Generally, $CO_2$ has a critical point at about 31 degrees C. and 7.4 MPa. The presence of 1% of $H_2$, $O_2$, carbon monoxide, or $H_2O_2$ elevates the critical-point pressure slightly to about 7.6 to 7.7 MPa, while 5% of those substances raises the pressure to 8.6 to 8.8 MPa at 29 to 31 degrees C. The presence of 1% $H_2O$, however, increases the critical point to about 36 degrees C. and 8.1 MPa. The presence of 5% $H_2O$ elevates the critical point to about 45 degrees C. at 8.9 MPa. Because the critical point of the sCO2 is desired for efficient operation of the compressors and coolers, the removal of water from the combustion mixture is as complete as possible to ensure highest possible efficiency of the operation of those systems.

The combustion process can be done at any potential pressure level. However, the pressure level in the system is preferably between 25 to 30 MPa. The $H_2$, $O_2$, and sCO2 streams are in this pressure level range at the inlet to the combustor 7.

The ideal chemical reaction described above does not necessarily describe the actual combustion process and dynamics. In reality, the combustion process which may result in partially incomplete combustion, leaving traces of $H_2$ and $O_2$ in the working fluid that exits the combustor 7. However, application of a proper and detailed thermodynamic optimization will directly affect the species mixture in the working fluid of Cycle II, and will mitigate and eliminate those effects.

One component potentially affected by polluted working fluid is the turbine, as it follows directly after the combustor 7.

Figure 16:
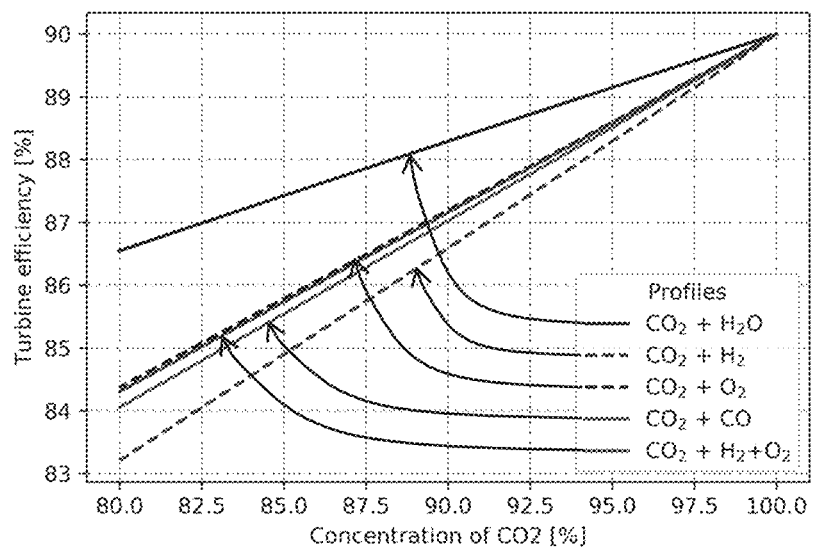
FIG. 16 is a graph of the effect of various mixtures of substances with $CO_2$ working fluid on the turbine efficiency.

FIG. 16 shows the impact of various $CO_2$ mixtures with $H_2O$, $H_2$, $O_2$, CO and $2H_2+O_2$ on turbine efficiency, which decreases with decreasing purity of the $CO_2$ stream. Although it affects the turbine efficiency, $H_2O$ has the least effect, indicating that the combustion of the $H_2$ with the $O_2$ should be complete and balanced, without any surviving $H_2$ or $O_2$ in the mixture. This can be controlled by mass flow control of the gases leaving the CFC units, by desorption temperature control, or by controlling the valves to yield the appropriate pressures and flow rates of the $H_2$ and $O_2$ so that the amounts of the $H_2$ and $O_2$ supplied from the CFC units to the combustor are stoichiometrically appropriate for complete combustion with each other.

Figure 17:
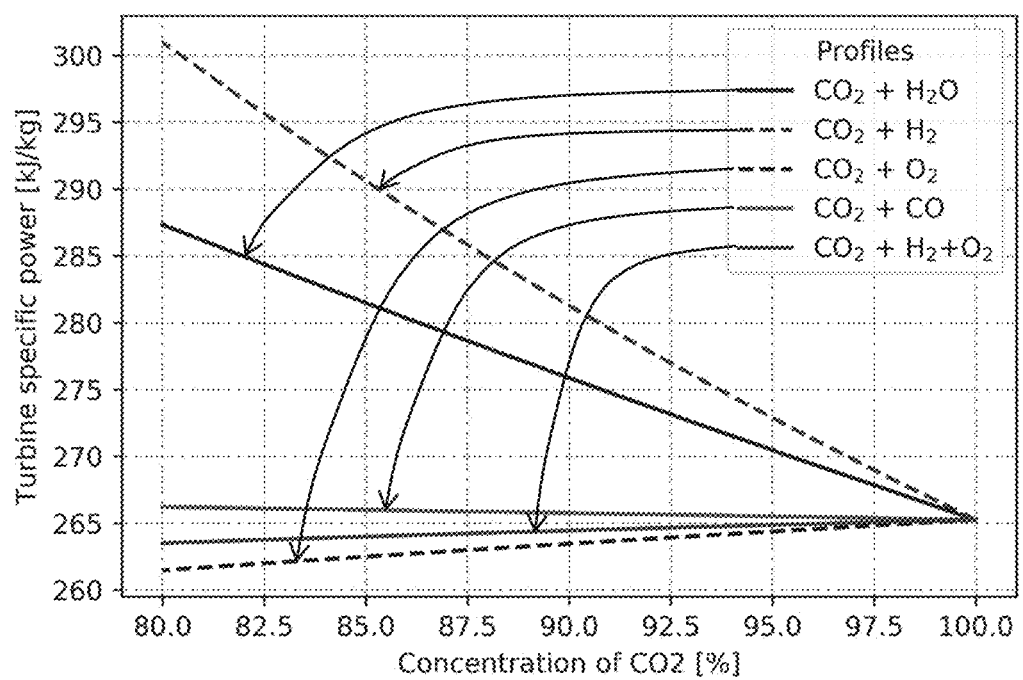
FIG. 17 is a graph of the effect of various mixtures of substances with $CO_2$ working fluid on the turbine specific power.

FIG. 17 shows the effect on turbine specific power of different purity of the $CO_2$ stream with those same added substances, i.e., $H_2O$, $H_2$, $O_2$, CO and $H_2+O_2$. Generally, decreasing purity increases the turbine specific power with, except for mixtures with $O_2$ or $2H_2+O_2$. Both those mixtures exhibit a slight decrease in the specific power. The mixtures are moving with turbine outlet enthalpy, which increases/decreases the actual turbine work.

Figure 18:
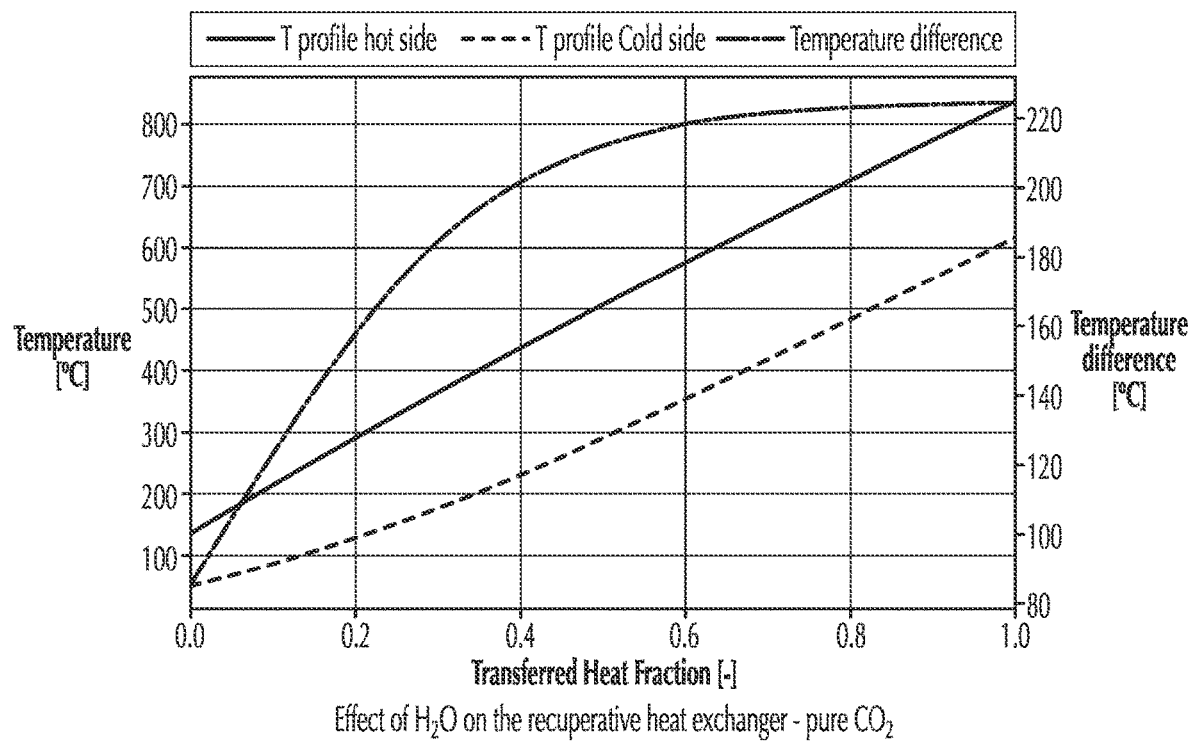
FIG. 18 is a pair of graphs showing the effect of $H_2O$ on the recuperative heat exchanger.
Figure 18:
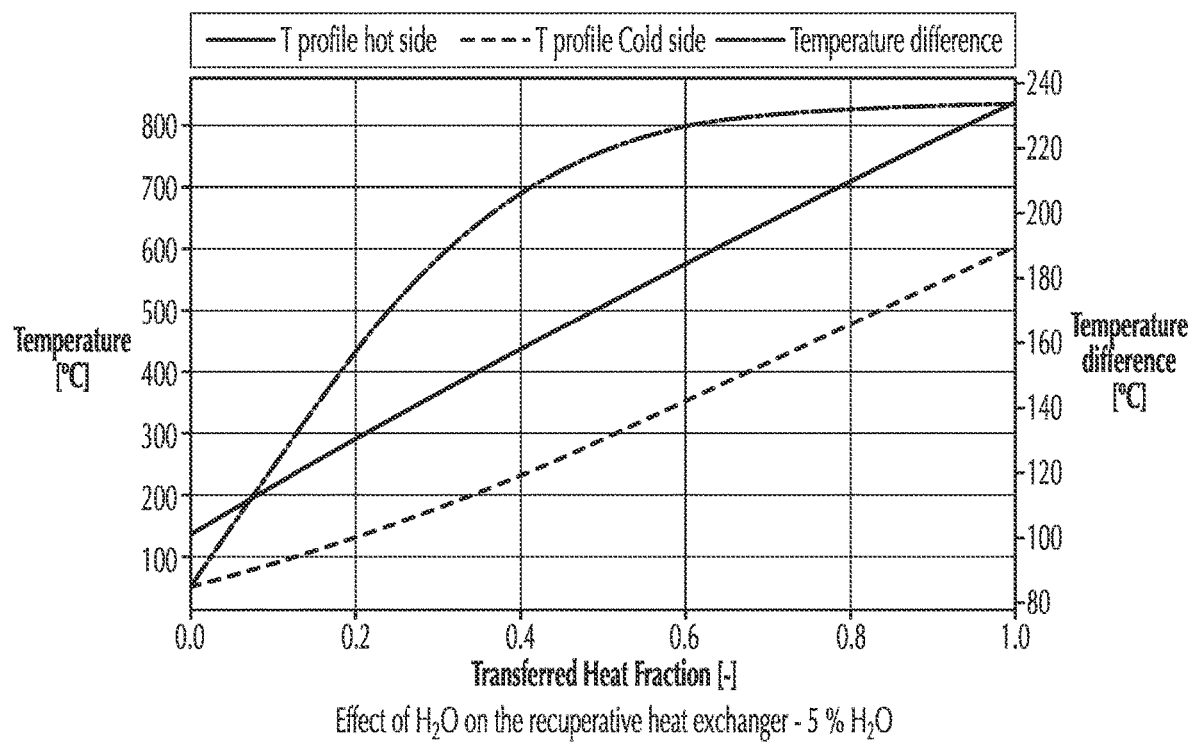

Another component that may be affected by mixtures of compounds with the sCO2 is the recuperative heat exchanger 23, especially on its hot side (low-pressure side). The cold side has a pure sCO2 stream after the water separation in the compressor stages. The effect of the recuperative heat exchanger is shown in FIG. 18. The mixture with $H_2O$ has an effect on the temperature difference and heat transfer area. The effect of the RHX is different (positive or negative) for each substance and purity of $CO_2$. The size of the RHX can be reduced by getting the purity of the sCO2 as high as possible. This also indicates a benefit of removing as much of the water as possible from the combustion output mixture.

For the foregoing reasons, the levels of $H_2$, $O_2$, and $H_2O$ in the mixture are controlled and selected to optimize, to the extent possible, the operation of the turbine and the heat exchangers. Control of the supply of $H_2$ or $O_2$ so as to provide for stoichiometrically matching discharge rates from the CFC units can be accomplished by controlling the heat applied to the respective CFC unit, or by controlling the valves at the outlets of the CFC units.

The $H_2O$ is removed from the sCO2 system in the water separation units 9, 21. This reduces potential challenges with the water supply at the power plant location and increases the overall self-sufficiency of the system. The water cycle is a closed cycle with minimal support of water reservoirs (or water makeup). For this reason, the system can be used in regions with limited or no water resources. For the same reason, the system is designed with air cooling. The potential water leakage is collected from all systems and transported into the water storage tank 13.

In the event that the amount of $CO_2$ in the system drops for some reason, such as leakage, a connection to a source of $CO_2$ allows for replenishment of the $CO_2$ working fluid in Cycle II.

Cycle III (Cooling/Heating)

Cycle III (cooling/heating) includes an air cooler 51 and the CFC storage system 17, 19.

The purpose of Cycle III is to cool the sCO2 stream to remove $H_2O$ in the liquid phase from the sCO2 stream (gas phase). At the same time, when the $H_2$ and $O_2$ are being released from storage, the sCO2 stream heats the cryogenically stored $O_2$ and $H_2$ in the CFC storage units 17, 19 to increase storage pressure to operating pressure, i.e., inlet to combustor. The stored hydrogen and oxygen in the CFC storage tanks is in the gas phase but at liquid-like densities. Added heat promotes the desorption of the gas from the adsorption material, e.g., aerogel retention material, in the CFCs, and the gas when released occupies a larger volume. As the system is closed, however, the result is that the pressure within the system increases. This effect is referred to as self-pressurization.

This is a unique advantage of the cycle, because it eliminates the need of hydrogen and oxygen compression to the high pressure levels of the working fluid. This reduces the capital and operating cost, as no additional gas compression equipment is needed and no additional work in addition of the waste heat utilization is needed. The remainder of the heat that is not transferred to the CFCs for self-pressurization is removed from the sCO2 stream by an air cooler that releases the heat to the ambient atmosphere.

A constraint on the direct-fired H2/sCO2 power cycle is the minimum operating temperature, because the system is cooled by an air cooler. The minimal operating temperature therefore depends on the ambient temperature. The minimal operation temperature/compressor inlet temperature has an effect on required compressor power, which may reduce overall systems efficiency and net power. For this reason, the temperature is maintained as close as possible to the critical point of $CO_2$.

Operation Regimes

The system operates in two regimes, depending on the occupancy of the electrical grid 31.

In the first regime, the direct-fired $H_2$/sCO2 power cycle is in cumulated operation for approximately 8,000 hours/year. During this time, the system transfers electrical power to the electrical grid 31. The fuel is fed to the combustion chamber 7 from the $H_2$ and $O_2$ storage CFCs 9, 11. The CFC system 9, 11 stores $H_2$ and $O_2$ for a minimum of 24 operating hours. This avoids disconnection of the $H_2$ production from the electrolyzer 15. For the same reason, $H_2O$ is continually stored in the water storage tank as it is sequestrated out of the sCO2 stream.

In the second regime, the electrolyzer 15 produces $H_2$ and $O_2$ from the $H_2O$ storage 13. The $H_2/O_2$ production is carried out only during an excess of electrical power in the electrical grid 31, for instance, during night-time operation or higher production from renewable power sources than current power demand. The electrolyzer is directly connected to, and powered by, the electrical grid 31.

Both operation regimes have an effect on electrical grid stability and help to mitigate grid transients through load shifting and peak shaving, an essential requirement for an interconnected grid with a high penetration of renewable energy sources.

Operational Parameters

Operational parameters for the system may vary, but some optimal parameters are indicated, some of which are set out in Table 3, below. These are representative numbers and by no means restrict this innovation to only those values or ranges.

TABLE 3

| | Lower Level | Upper Level | Units |
|---|---|---|---|
| Turbine inlet pressure | 25 | 30 | MPa |
| Turbine inlet temperature (TIT) | 1473 | 1673 | K |
| Pump/compressor inlettemperature | 308 | 323 | |
| Turbine efficiency | 90 | | % |
| Compressor and pumpefficiency | 80 | | |
| Recuperative effectiveness | 90 | | |
| Compressor inlet pressure | 3 | 7 | MPa |

Based on the isovolumetric process of the CFCs of FIGS. 4 to 6, the $H_2$/sCO2 direct-fired power system requires that the temperature at point $P_6$ has to be higher than the maximum temperature in the volumetric process (CFC). Operation was analyzed for a mass flow rate of 1 kg/sec (at point $P_4$, i.e., the turbine inlet) and for the turbine inlet pressure 25 to 30 MPa and turbine inlet temperature 1,473 degrees K to 1,673 degrees K. The compressor inlet pressure was constant value equal to 3.5 MPa.

Figure 19:
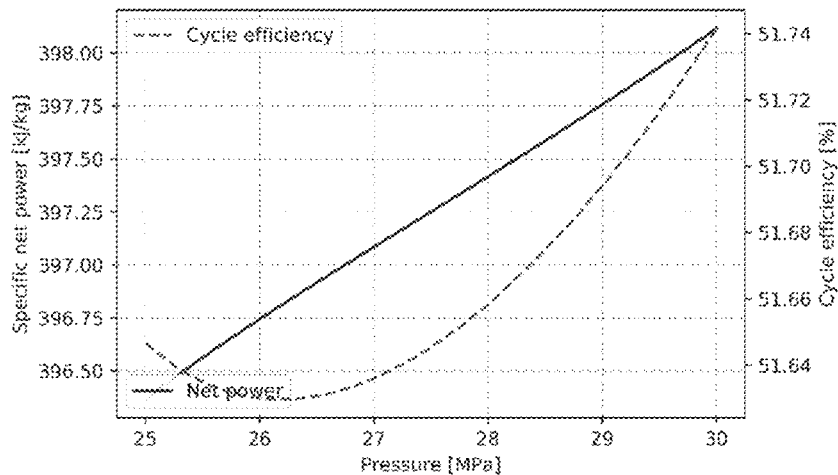
FIG. 19 is a graph of specific net power and cycle efficiency for varying turbine inlet pressure and a turbine inlet pressure of 1,473 degrees K.

The total cycle efficiency can reach values between 51 to 55%. The cycle efficiency increases with increasing TIT and is approximately constant for different turbine inlet pressures with constant TIT. The efficiency for a constant TIT equal to 1,473 degrees K and varying pressure between 25 to 30 MPa is shown in FIG. 19. Similar results occur for different compressor inlet pressures and TITs.

A very important parameter for the $H_2$/sCO2 direct-fired systems of the invention is the temperature at point $P_6$ (see FIG. 2). The temperature at point $P_6$ is the restriction for connection to the CFC storage unit.

As seen in FIG. 8, the $H_2$ and $O_2$ need to be heated to 110 degrees K. The heat required to heat the $H_2$ and $O_2$ depends on the required outlet pressure of the CFC units 17 and 19 (which is also the combustor 7 inlet pressure). The temperature at point $P_6$ is between 410 to 430 degrees K for all potential turbine inlet pressures and TITs in the present analysis. The temperature at point $P_6$ can be reduced or increased based on the number of compressor stages 25, $A_2$-$A_n$, and the effectiveness of the recuperative heat exchanger 23.

The CFC unit has the necessary heating power available in the power cycle cooling system. The heating power is available for all potential configurations of the $H_2$/sCO2 direct-fired sCO2 power cycle (i.e. number of compression stages, TIT, turbine inlet pressure, compressor inlet pressure, mass flow). Hence, the present $H_2$/sCO2 power system offers affordable and reliable energy production based on $H_2$ production and combustion. Without the CFC units, the power required for $H_2$ and $O_2$ compression would take more than 50% of the gross production from the $H_2$/sCO2 direct-fired power cycle.

The heat that is not transferred to the CFC is cooled in an air cooler that must be capable of providing all required cooling power, based on the operation regime. The required heat for the CFC unit may change during the operation.

The cooling line (sCO2 stream) is divided into two streams with different mass flow rates via specific ratios. The ratio depends on the required heat for the CFC and continually is changed. The specific added heat increases with increasing TIT and is a constant for different pressures with identical TIT.

With the TIT fixed at 1,473 degrees K, optimization that respected the current maximum operation TIT for the oxy-combustion sCO2 direct-fired power cycle yielded the results are shown in Table 4. With these parameters applied in the system, the generator efficiency is 96%, clutch efficiency is 95%, and gearbox efficiency is 93%.

TABLE 4

$H_2$/sCO2 direct-fired power cycle results

| Parameter | Amount | Units |
| --- | --- | --- |
| Flow rate (mass flow rate at the turbine inlet) | 1.0 | kg/s |
| Cycle efficiency | 52.3 | % |
| Compressor input power | 91.17 | kWth |
| Added heat | 785.03 | |
| Removed heat | 371.02 | |
| Turbine power output | 502.49 | |
| Gross power | 410.32 | |
| Net power | 348 | kWe |

In the preferred embodiment, the $H_2$/sCO2 system is operated at a turbine inlet pressure of 30 MPa, a compressor inlet pressure of 3.5 Mpa, a turbine inlet temperature (TIT) of 1473.15° K and a compressor inlet temperature (CIT) of 308.15° K, with a resulting cycle efficiency of 52.3%, which is comparable to the efficiency oxy-combustion direct-fired sCO2 cycle with similar operating parameters.

Figure 20:
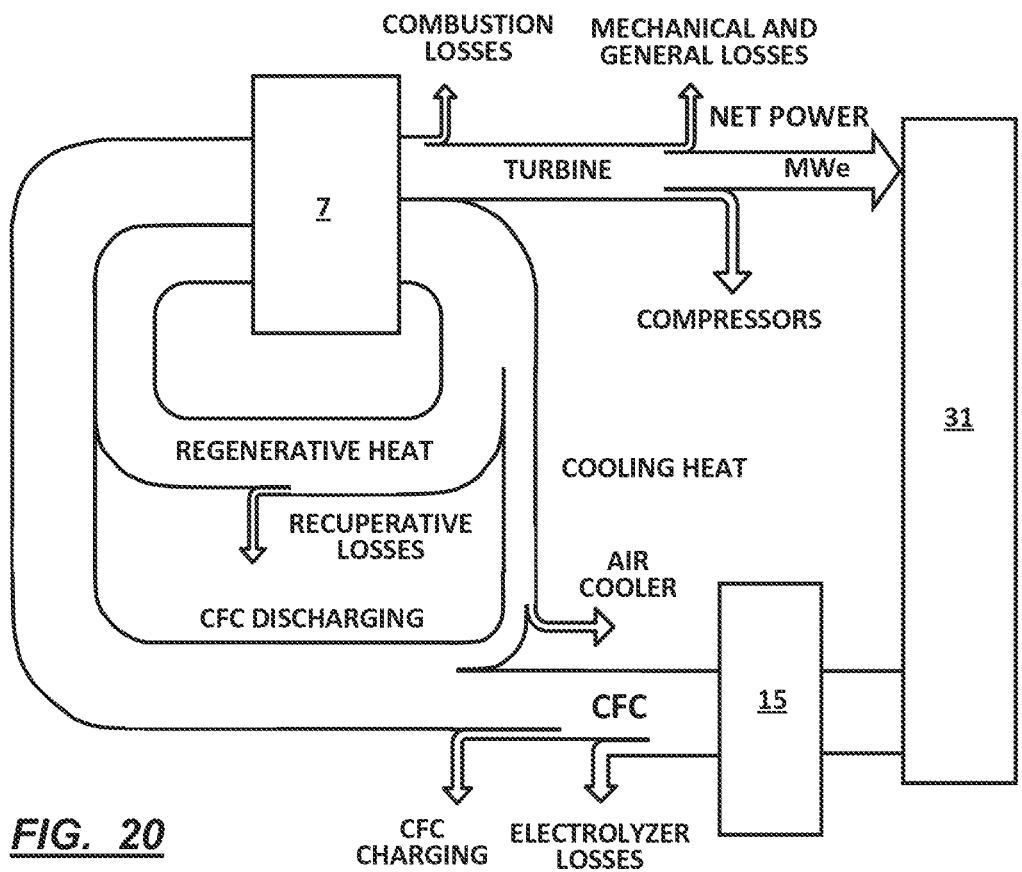
FIG. 20 is a Sankey diagram of energy flow in the $H_2$/sCO2 direct-fired power cycle of the preferred embodiment.

FIG. 20 is a Sankey diagram showing the energy flow in the cycle of the system. Surplus energy flows from the grid 31 to the electrolyzer 31, where it is converted into stored hydrogen and oxygen gas in CFC units, with a loss of energy in the electrolysis system and in energy expended in causing adsorption of the $H_2$ and $O_2$ in the CFC units. The CFC units are exposed at a later point in time to regenerative heat from the turbine combustor 7 which causes them to release the $H_2$ and $O_2$ to the combustor 7, which converts the $H_2$ and $O_2$ to $H_2O$, releasing the stored energy from electrolysis.

The resulting heat energy is partially lost as combustion losses, but a substantial portion of the heat goes to the turbine, causing generation of electrical energy that flows to the grid 31, with some mechanical losses in the process. Some of the turbine heat output also drives compressors that compress the sCO2 in the turbine cycle. Another portion of the heat from combustion flows to an air cooler and released to the air in the ambient environment, and a portion also is flowed back as regenerative heat and used to heat the CFC units to release more $H_2$ and $O_2$ to be combusted together in the combustion chamber 7 of the turbine system.

Although the cycle efficiency of the current system is similar to the oxy-combustion direct-fired sCO2 cycle of earlier systems, those earlier systems lack the advantages of the present $H_2$/sCO2 direct-fired power cycle, which has no emission of $NO_x$, and constitutes a closed system with $H_2$, $O_2$, and $H_2O$ subsystems and CFC storage units.

The direct-fired H2/sCO2 power system with integrated CFC storage units and $H_2$ production is a closed system with production of $H_2$ and separation of $H_2O$ from the sCO2 working fluid stream. This eliminates any potential required $H_2O$ storage and supply systems, and the system can be installed and operated in an area without a water source. The cooling system is air cooling connected to the CFC storage units.

The use of CFC storage units reduces the compressor power required as compared to a cryogenic storage system. The CFC units can use heat removed from the power cycle to heat and release the adsorbed $H_2$ and $O_2$ without an additional compressor to elevate the pressure of those combustion gases to the pressure of the working fluid in the turbine. Instead, the outlet pressure from the CFCs corresponds to the required pressure on the combustion chamber.

The heat removed from the turbine combustion product mixture is preferably used as heating power for the CFC units, and the overall system therefore functions as a closed system. The direct-fired $H_2$/sCO2 power cycle has several advantages compared with an oxy-combustion direct-fired sCO2 cycle, including that fact that the system is a closed system with $H_2$, $O_2$, and $H_2O$ subsystems, there are no emissions of the $NO_x$ or $H_2S$, the maximum operation temperature (TIT) is very high and much higher than other systems, and the power cycle is integrated with the electrolyzer closed water cycle and the CFC-based storage system.

The system compares favorably with other direct-fired systems, and its expected cycle efficiency is 52%, which is comparable to the efficiency of an oxy-combustion direct-fired sCO2 cycle with similar operating parameters, and the expected net power is 348 kWe for 1 kg/sec in the turbine stream. The $H_2$/sCO2 power system disclosed here therefore offers affordable and reliable energy production based on $H_2$ production, storage, and combustion.

The terms used herein should be read as terms of description rather than of limitation. While embodiments of the invention have here been described, persons skilled in this art will appreciate changes and modifications that may be made to those embodiments without departing from the spirit of the invention, the scope of which is set out in the claims.

What is claimed is:

1. A system for storing electrical energy from a power supply and subsequently releasing the stored energy, said system comprising:
   an input receiving the electrical energy from the power supply;
   a reservoir holding water;
   an electrolysis device connected with the reservoir and receiving the electrical energy from the input, said electrolysis device using the electrical energy to electrolyze the water in the reservoir so as to convert the water to hydrogen gas and oxygen gas;
   a first storage device receiving and storing the hydrogen;
   a second storage device receiving and storing the oxygen;
   first and second conduits connected with outputs of the first and second storage devices respectively and carrying the hydrogen and the oxygen, respectively, thereof when released from the storage devices;
   a turbine system having a combustion chamber with which the first and second conduits communicate so that the hydrogen and oxygen from the storage devices flow through the first and second conduits and combine in the combustion chamber and said hydrogen is combusted with the oxygen therein so as to form water and generate energy driving the turbine system so as to turn an output shaft thereof; and
   a generator operatively associated with the output shaft of the turbine system so as to produce electricity when the output shaft turns and to output the electricity through an electrical output connection; and wherein the first storage device stores the hydrogen as a physioadsorbed fluid that is released when heat is supplied to the first storage device; and wherein at least a portion of heat from the combustion of the hydrogen in the turbine system is sent to the first storage device so as to release more hydrogen stored therein.

2. The system of claim 1, wherein the turbine system uses a working fluid of supercritical $CO_2$, that mixes with the hydrogen and the oxygen during combustion of the hydrogen, and the combustion takes place in the substantial absence of nitrogen.

3. The system of claim 2, and a separator that separates the water from the supercritical $CO_2$ after combustion in the combustion chamber, and transmits the water to the reservoir for reuse in the electrolysis device.

4. The system of claim 1, wherein the first and second storage devices are each a cryogenic flux capacitor ("CFC") unit having therein retention material to which the hydrogen or oxygen are adsorbed exothermically during storage.

5. The system of claim 4, wherein the CFC units are configured to receive heating fluid so as to heat the retention material and cause the hydrogen or oxygen adsorbed therein to be released from the unit;

the system having pressure release control valves that hold the stored hydrogen or oxygen in the CFC units until pressure thereof exceeds a predetermined threshold pressure level, after which the control valves permit passage of the hydrogen or oxygen therethrough to the combustion chamber.

6. A system for storing electrical energy from a power supply and subsequently releasing the stored energy, said system comprising:

an input receiving the electrical energy from the power supply;

a reservoir holding water;

an electrolysis device connected with the reservoir and receiving the electrical energy from the input, said electrolysis device using the electrical energy to electrolyze the water in the reservoir so as to convert the water to hydrogen gas and oxygen gas;

a first storage device receiving and storing the hydrogen;

a second storage device receiving and storing the oxygen;

first and second conduits connected with outputs of the first and second storage devices respectively and carrying the hydrogen and the oxygen, respectively, thereof when released from the storage devices;

a turbine system having a combustion chamber with which the first and second conduits communicate so that the hydrogen and oxygen from the storage devices flow through the first and second conduits and combine in the combustion chamber and said hydrogen is combusted with the oxygen therein so as to form water and generate energy driving the turbine system so as to turn an output shaft thereof; and a generator operatively associated with the output shaft of the turbine system so as to produce electricity when the output shaft turns and to output the electricity through an electrical output connection;

wherein the first and second storage devices are each a respective cryogenic flux capacitor ("CFC") unit having therein retention material to which the hydrogen or oxygen are adsorbed exothermically during storage;

wherein the CFC units are configured to receive heating fluid so as to heat the retention material and cause the hydrogen or oxygen adsorbed therein to be released from the unit;

the system having pressure release control valves that hold the stored hydrogen or oxygen in the CFC units until pressure thereof exceeds a predetermined threshold pressure level, after which the control valves permit passage of the hydrogen or oxygen therethrough to the combustion chamber, the predetermined pressure being about 200 atm; and wherein a heat exchanger extracts heat from products of the combustion of the hydrogen in the turbine system and uses at least a portion of said heat to heat the heating fluid sent to the CFC units to release more of the hydrogen and oxygen stored therein.

7. The system of claim 1, wherein control circuitry detects when the power supply is generating surplus electrical energy and, responsive to detection of the surplus electrical energy, causes the system to store the surplus electrical energy.

8. The system of claim 7, wherein said system includes a battery storage, said control circuitry determining based on system conditions whether to store the surplus electrical energy using the battery storage or by electrolyzing the water.

9. The system of claim 1, wherein control circuitry detects a demand for power automatically, and initiates release of the hydrogen and oxygen from the storage devices and combustion of the released hydrogen with the released oxygen in the combustion chamber of the turbine system.

10. The system of claim 2, wherein the turbine system has a turbine inlet temperature of 1,100° C. to 1,400° C.

11. The system of claim 4, wherein a coolant system provides coolant that cools the retention material during storage of the hydrogen and oxygen so that the hydrogen and the oxygen are adsorbed thereto and stored in the respective storage devices.

12. The system of claim 5, wherein the predetermined pressure is about 200 atm.

13. A system comprising:

a power supply generating electrical current at time-varying power levels;

an electrolysis device connected with the power supply and receiving the electrical current from the power supply, said electrolysis device using the electrical current to electrolyze the water in the reservoir so as to convert the water to hydrogen gas and oxygen gas;

a first cryogenic flux capacitor device receiving the hydrogen so that the hydrogen is adsorbed into retention material thereof, and a second cryogenic flux capacitor device receiving the oxygen so that the oxygen is adsorbed into retention material of the second cryogenic flux capacitor device;

first and second conduits connected with outputs of the first and second cryogenic flux capacitor devices respectively, said first and second conduits each having a respective pressure valve therein blocking passage of the hydrogen or the oxygen therethrough until pressure of the hydrogen or oxygen exceeds a predetermined pressure;

a turbine system containing supercritical $CO_2$ as working fluid flowing through the first and second conduits so that the supercritical $CO_2$ mixes with the hydrogen and oxygen therein;

the turbine system having a combustion chamber to which the conduits communicate and wherein the hydrogen and is combusted with the oxygen so as to form a heated mixture of water with the supercritical $CO_2$ that drives a turbine output shaft;

heat exchanger extracting heat from the mixture after passage through the turbine and transmitting the heat at least partially so as to heat the first and second cryogenic flux capacitor devices;

a separator separating the water from the supercritical $CO_2$ and supplying the water to the reservoir so that the system operates as a closed system substantially without any intake of air or any release of $CO_2$ or water; and a generator operatively associated with the turbine output shaft so as to produce electricity when the shaft turns and to output the electricity through an electrical output connection.

14. The system of claim 13 wherein first and second flows of supercritical $CO_2$ mix with the hydrogen and oxygen respectively and said flows combine in the combustion chamber so as to intermix the hydrogen with the oxygen and combust therein.

15. The system of claim 13 wherein the turbine system is operated at a turbine inlet pressure of 26 to 34 MPa and a turbine inlet temperature of 1,423° K to 1,523° K, and has a compressor for the supercritical $CO_2$ with a compressor inlet pressure of 3.4 to 3.6 MPa and a compressor inlet temperature of 290° K to 330° K.

16. A system for storing electrical energy from a power supply and subsequently releasing the stored energy, said system comprising:

an input receiving the electrical energy from the power supply;

a reservoir holding water;

an electrolysis device connected with the reservoir and receiving the electrical energy from the input, said electrolysis device using the electrical energy to electrolyze the water in the reservoir so as to convert the water to hydrogen gas and oxygen gas;

a hydrogen storage device receiving and storing the hydrogen by exothermic physisorption, said hydrogen storage device releasing the stored hydrogen responsive to supply of heat to the hydrogen storage device;

a conduit connected with an output of the hydrogen storage device and carrying the hydrogen released therefrom;

a turbine system having a combustion chamber with which the conduit communicates so that the hydrogen released from the hydrogen storage device flows through the conduit and into the combustion chamber, said hydrogen being combusted into water in the combustion chamber so as to generate energy driving the turbine system so as to cause turning of an output shaft; and a generator operatively associated with the output shaft, said generator producing electricity and outputting the electricity through an electrical output connection responsive to the turning of the output shaft;

wherein at least a portion of heat from the combustion of the hydrogen in the turbine system is supplied to the hydrogen storage device so as to release additional hydrogen stored therein so as to be combusted in the combustion chamber.

17. The system of claim 16, wherein the system further comprises an oxygen storage system receiving and storing oxygen from the electrolysis;

a conduit connected with an output of the oxygen storage device and communicating with the combustion chamber, the conduit carrying oxygen released from the oxygen storage device to the combustion chamber, wherein the hydrogen is combusted using the oxygen without addition of any air to the turbine system; and wherein the turbine system includes a supercritical $CO_2$ cycle that uses sCO2 as a working fluid, and the hydrogen is combusted in the combustion chamber so that the water produced is mixed with the sCO2 working fluid.

18. The system of claim 17, wherein a water separator separates at least a portion of the water produced when the hydrogen is combusted from the sCO2, and the separated water is transmitted to the reservoir.

19. The system of claim 17, wherein the hydrogen storage device is an enclosed unit having therein a nanoporous aerogel material to which the hydrogen supplied from the electrolysis device is communicated so as to be exothermically adsorbed thereon;

the hydrogen storage device having passages therein, wherein during storage of the hydrogen coolant is selectively supplied to the passages so as to reduce temperature of the nanoporous aerogel material so as to cause adsorption thereto of the hydrogen being stored, and wherein, during releasing of the hydrogen from the aerogel material, heated fluid or gas is supplied to the passages so as to increase the temperature of the aerogel material and release the hydrogen.

20. The system of claim 19, wherein, when the hydrogen is being combusted in the combustion chamber, the heated fluid or gas is heated with heat extracted by a heat exchanger from the sCO2 and water heated by the combusting, and wherein, when the hydrogen is not being combusted, the heated fluid or gas is heated by an electrical heater powered by the electrical energy from the input or from a battery connected therewith.

21. The system of claim 19, wherein a pressure valve is supported between the combustion chamber and the hydrogen storage device, said pressure valve preventing passage of hydrogen released from the hydrogen storage device to the combustion chamber until pressure of the released hydrogen exceeds a threshold pressure for supply thereof to the combustion chamber.

22. The system of claim 18, wherein the oxygen storage system stores oxygen from the electrolysis by exothermic physisorption, said oxygen storage device releasing the stored oxygen responsive to supply of heat to the hydrogen storage device; and wherein the oxygen is released from the oxygen storage device by supplying heat thereto produced from the combusting of the hydrogen in the combustion chamber.

23. The system of claim 22, wherein the oxygen storage device is an enclosed unit having therein a nanoporous aerogel material to which the oxygen supplied from the electrolysis device is communicated so as to be exothermically adsorbed thereon;

the oxygen storage device having passages therein, wherein, during storage of the oxygen, coolant is supplied to the passages so as to reduce temperature of the nanoporous aerogel material so as to cause adsorption thereto of the oxygen being stored, and wherein, during releasing of the oxygen from the aerogel material, heated fluid or gas is supplied to the passages so as to increase the temperature of the aerogel material and release the oxygen.

24. The system of claim 16, wherein the power supply is a solar or wind-powered electricity generator.

\* \* \* \* \*